(12) United States Patent
Akuta et al.

(10) Patent No.: US 6,658,645 B1
(45) Date of Patent: Dec. 2, 2003

(54) METHOD FOR AUTOMATICALLY GENERATING CORRECTED PROGRAM INHERITED PROGRAM, AUTOMATIC PROGRAM GENERATION APPARATUS, AND STORAGE MEDIUM STORING PROGRAM FOR AUTOMATICALLY GENERATING CORRECTED PROGRAM INHERITED PROGRAM

(75) Inventors: Hiromi Akuta, Tokyo (JP); Masaki Izumi, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/477,340

(22) Filed: Jan. 4, 2000

(30) Foreign Application Priority Data

Jan. 28, 1999 (JP) .......................... 11-019868

(51) Int. Cl.$^7$ ................................ G06F 9/44
(52) U.S. Cl. ................ 717/106; 717/109; 717/110; 717/113; 717/124; 717/125; 717/126; 714/25; 714/48; 714/38
(58) Field of Search ............... 717/106, 108, 717/100, 124, 109, 101, 120, 126, 125; 714/25, 41, 48, 2, 38; 713/100

(56) References Cited

U.S. PATENT DOCUMENTS

| | | | | |
|---|---|---|---|---|
| 4,204,253 A | * | 5/1980 | van den Hanenberg et al. ....................... | 714/32 |
| 5,287,449 A | * | 2/1994 | Kojima ........................ | 345/161 |
| 5,410,648 A | * | 4/1995 | Pazel ........................... | 717/124 |
| 5,481,712 A | * | 1/1996 | Silver et al. ................. | 717/109 |
| 5,485,601 A | * | 1/1996 | Ching ......................... | 717/106 |
| 5,511,135 A | * | 4/1996 | Rhyne et al. ................ | 382/187 |
| 5,675,803 A | * | 10/1997 | Preisler et al. .............. | 717/131 |
| 5,689,684 A | * | 11/1997 | Mulchandani et al. ........ | 703/23 |
| 5,699,310 A | * | 12/1997 | Garloff et al. ............... | 717/108 |
| 5,758,156 A | * | 5/1998 | Kano .......................... | 713/100 |
| 5,842,020 A | * | 11/1998 | Faustini ...................... | 717/111 |
| 5,862,379 A | * | 1/1999 | Rubin et al. ................. | 717/109 |

(List continued on next page.)

FOREIGN PATENT DOCUMENTS

| | | |
|---|---|---|
| JP | 0-236628 | 9/1990 |
| JP | 07-056727 | 3/1995 |
| JP | 07-160491 | 6/1995 |
| JP | 10-021066 | 1/1998 |
| JP | 10-049358 | 2/1998 |

OTHER PUBLICATIONS

Title: On□line Text Editing: A Survey Andries van Dam, David E. Rice, ACM, Sep. 1971.*
Title: Interactive Editing Systems: Part II, Authors:Norman Meyrowitz, Andries van Dam, ACM, 1982.*
Title: An editor for revision control, Authors: Fraser et al, ACM, 1987.*

*Primary Examiner*—Chameli C. Das
(74) *Attorney, Agent, or Firm*—Staas & Halsey LLP

(57) ABSTRACT

An automatic program generation unit automatically generates a program according to designing information. When a code is added by a change in designing information, a corrected portion inheriting unit retrieves an added portion from a new program automatically generated according to the latest designing information. When a code is deleted by a change in designing information, the deleted portion is retrieved from a corrected program obtained by correcting the previous automatically-generated program. Then, the added portion obtained by the retrieval is added to the corrected program, and the deleted portion is deleted from the corrected program.

11 Claims, 53 Drawing Sheets

U.S. PATENT DOCUMENTS

| | | | |
|---|---|---|---|
| 5,892,949 A | * 4/1999 | Noble | 717/125 |
| 5,895,476 A | * 4/1999 | Orr et al. | 715/517 |
| 5,966,541 A | * 10/1999 | Agarwal | 717/132 |
| 5,987,247 A | * 11/1999 | Lau | 717/100 |
| 6,058,393 A | * 5/2000 | Meier et al. | 707/10 |
| 6,067,639 A | * 5/2000 | Rodrigues et al. | 714/38 |
| 6,275,976 B1 | * 8/2001 | Scandura | 717/120 |
| 6,357,021 B1 | * 3/2002 | Kitagawa et al. | 714/41 |
| 6,405,364 B1 | * 6/2002 | Bowman-Amuah | 717/101 |
| 6,557,166 B2 | * 4/2003 | Shinohara et al. | 717/124 |

* cited by examiner

FIG. 5

| Table | File | | | | | | | | | | | |
|---|---|---|---|---|---|---|---|---|---|---|---|---|
| T_PROJECT | MFH010A.MDB | PROGRAM ID | SYSNAME | KAISYAMEI | | | | | | | | |
| T_GROUP ID MASTER | MFH040A.MDB | PROGRAM ID | GROUP ID | GROUP CONSTANT | | | | | | | | |
| T_ACTION | MFH041A.MDB | PROGRAM ID | FORM INDEX | GROUP ID | | | | | | | | |
| T_FORM LIST | MFH041A.MDB | PROGRAM ID | FORM ID | FORM INDEX | | | | | | | | |
| T_FORM INDEX | MFH041A.MDB | PROGRAM ID | | FORM ID | START-UP | | | | | | | |
| T_PROGRAM LISTING | MFH041A.MDB | | | PROGRAM ID | PROGRAM NAME | | | | | | | |
| T_INPUT/OUTPUT INFORMATION DEFINITION | MFH041A.MDB | PROGRAM ID | FORM ID | SORTNO | ITEM ID | LEVEL | ITEM NAME | GROUP ID | TYPE | ATTRIBUTE | NUMBER OF DIGITS | NUMBER OF DECIMAL PLACES |
| T_GROUP ACTION LISTING | MFH041A.MDB | PROGRAM ID | FORM INDEX | GROUP ID | | ACTION TYPE | ACTION INFORMATION | ACTION INFORMATION | | | | |
| T_ACTION DEFINITION | MFH031A.MDB | PROGRAM ID | ACTION ID | DEFAULT PF KEY | NAME | | | | | | | |

← ADDING PROGRAM ID OTHER THAN ITEMS IN EXISTING TABLE FOR RE-MOCK-UP

61 FORM INDEX TABLE OF OLD DESIGNING INFORMATION

| PROGRAM ID | FORM ID | START UP |
|---|---|---|
| AATESTVE | AATEST06 | ✓ |
| JYU010VE | JYU01001 | ✓ |
| JYU010VE | JYU01003 | ☐ |
| JYU014VE | JYU01004 | ✓ |
| JYU014VE | TEST1005 | ☐ |
| SAI010VE | JYU01001 | ✓ |
| SAI010VE | JYU01003 | ☐ |
| SAI010VE | SAI01050 | ☐ |
| SAI010VE | SAI01070 | ☐ |

FIG. 6

71 FORM LISTING TABLE OF OLD DESIGNING INFORMATION

| PROGRAM ID | FORM ID | FORM INDEX |
|---|---|---|
| AATESTVE | AATEST06 | 85 |
| JYU010VE | JYU01001 | 1 |
| JYU010VE | JYU01003 | 24 |
| JYU014VE | JYU01004 | 37 |
| JYU014VE | TEST1005 | 81 |
| SAI010VE | JYU01001 | 1 |
| SAI010VE | JYU01003 | 24 |
| SAI010VE | SAI01050 | 82 |
| SAI010VE | SAI01070 | 83 |

FIG. 7

81 ACTION TABLE OF OLD DESIGNING INFORMATION

| PROGRAM ID | FORM INDEX | GROUP ID |
|---|---|---|
| AATESTVE | 85 | 1 |
| AATESTVE | 85 | 5 |
| JYU010VE | 1 | 0 |
| JYU010VE | 1 | 1 |
| JYU010VE | 1 | 5 |
| JYU010VE | 1 | 7 |
| JYU010VE | 24 | 1 |
| JYU010VE | 24 | 7 |
| JYU014VE | 37 | 1 |
| JYU014VE | 81 | 0 |
| JYU014VE | 81 | 1 |
| JYU014VE | 81 | 5 |
| JYU014VE | 81 | 7 |
| SAI010VE | 1 | 0 |
| SAI010VE | 1 | 1 |
| SAI010VE | 1 | 5 |
| SAI010VE | 1 | 7 |
| SAI010VE | 24 | 1 |
| SAI010VE | 24 | 7 |
| SAI010VE | 82 | 6 |
| SAI010VE | 83 | 1 |
| SAI010VE | 83 | 5 |

91 GROUP ACTION LISTING TABLE OF OLD DESIGNING INFORMATION

| PROGRAM ID | FORM INDEX | GROUP ID | ACTION ID | ACTION TYPE | ACTION INFORMATION 1 | ACTION INFORMATION 2 |
|---|---|---|---|---|---|---|
| AATESTVE | 851 | | ENT | GRP | 5 | |
| AATESTVE | 851 | | FIN | END | | |
| AATESTVE | 855 | | ESC | ESC | 1 | |
| AATESTVE | 855 | | NXT | M_N | | |
| AATESTVE | 855 | | BFR | M_B | | |
| AATESTVE | 855 | | ENT | DBU | 1 | |
| JYU010VE | 10 | | NEW | ETC | | |
| JYU010VE | 10 | | UPD | ETC | | |
| JYU010VE | 10 | | ENT | GRP | 1 | |
| JYU010VE | 10 | | DLT | ETC | | |
| JYU010VE | 10 | | FIN | END | | |
| JYU010VE | 11 | | SUB | ETC | | |
| JYU010VE | 11 | | FIN | END | | |
| JYU010VE | 11 | | JSS | FRM | JYU01003 | |
| JYU010VE | 11 | | TKI | EXE | JYU040VE | 1 |
| JYU010VE | 11 | | UPD | ETC | 5 | |
| JYU010VE | 11 | | DLT | ETC | 5 | |
| JYU010VE | 11 | | ENT | GRP | 5 | |
| JYU010VE | 11 | | COD | COD | | |
| JYU010VE | 15 | | DLT | ETC | | |
| JYU010VE | 15 | | NXT | M_N | | |
| JYU010VE | 15 | | BFR | M_B | | |
| JYU010VE | 15 | | ESC | ESC | 1 | |
| JYU010VE | 15 | | COD | COD | | |
| JYU010VE | 15 | | ENT | GRP | 7 | |
| JYU010VE | 17 | | BFR | M_B | | |
| JYU010VE | 17 | | NXT | M_N | | |
| JYU010VE | 17 | | ESC | ESC | 5 | |
| JYU010VE | 17 | | ENT | DBU | 1 | |
| JYU010VE | 17 | | FIN | FRM | JYU01001 | 1 |
| JYU010VE | 241 | | ENT | GRP | 7 | |
| JYU010VE | 241 | | TKN | FRM | JYU01001 | 1 |
| JYU010VE | 247 | | ESC | ESC | 1 | |
| JYU010VE | 247 | | NXT | M_N | | |
| JYU014VE | 371 | | ESC | FRM | TEST1005 | 1 |
| JYU014VE | 371 | | BFR | M_B | | |
| JYU014VE | 371 | | ENT | FRM | TEST1005 | 5 |
| JYU014VE | 375 | | BFR | M_B | | |
| JYU014VE | 375 | | COD | COD | | |
| JYU014VE | 375 | | DLT | ETC | | |
| JYU014VE | 375 | | ENT | GRP | 7 | |
| JYU014VE | 375 | | ESC | FRM | JYU01001 | 1 |

101 INPUT/OUTPUT INFORMATION DEFINITION TABLE OF OLD DESIGNING INFORMATION

| PROGRAM ID | FORM ID | BORTNO | ITEM ID | LEVEL | ITEM NAME | GROUP | TYPE | ATTRIBUTE | NUMBER OF DESIGNING INFORMATION | NUMBER OF DIGITS | NUMBER OF DECIMAL PLACES |
|---|---|---|---|---|---|---|---|---|---|---|---|
| AATESTVE | AATEST06 | 100 | CSTCD | | CUSTOMER CODE | 1 | TXT | D | | 06 | 0 |
| AATESTVE | AATEST06 | 200 | CSTNM | | CUSTOMER NAME | 1 | LBL | N | | 20 | 0 |
| AATESTVE | AATEST06 | 300 | C01A_ENT | | ENTER 01 | | BTN | B0 | | 00 | 0 |
| AATESTVE | AATEST06 | 400 | COSCD | M | COURSE CODE | 5 | TXT | XX | | 06 | 0 |
| AATESTVE | AATEST06 | 500 | COSNM | M | COURSE NAME | 5 | TXT | N | | 20 | 0 |
| AATESTVE | AATEST06 | 600 | COSDTE | M | NUMBER OF DAYS FOR COURSE | W | TXT | 9+ | | 00 | 0 |
| AATESTVE | AATEST06 | 700 | COSBIL | | COURSE FEE | W | TXT | 9+ | | 07 | 0 |
| AATESTVE | AATEST06 | 800 | COSYMD | | DATE OF COURSE | 5 | TXT | D | | 08 | 0 |
| AATESTVE | AATEST06 | 900 | C05A_ENT | | ENTER 05 | 5 | BTN | B0 | | 00 | 0 |
| JYU01OVE | JYU01001 | 100 | JYUNO | | ORDER NUMBER | 0 | TXT | 9+ | | 06 | 0 |
| JYU01OVE | JYU01001 | 150 | SYRMOD | | PROCESS MODE | 0 | LBL | N | | 02 | 0 |
| JYU01OVE | JYU01001 | 200 | C00A_ENT | | ENTER 00 | | BTN | B0 | | 00 | 0 |
| JYU01OVE | JYU01001 | 300 | TOKCD | | CLIENT CODE | 1 | TXT | 99 | | 06 | 0 |
| JYU01OVE | JYU01001 | 400 | TOKNM | | CLIENT NAME | 1 | LBL | N | | 20 | 0 |
| JYU01OVE | JYU01001 | 500 | TORKD | | TRANSACTION TYPE | 1 | CMD | XX | | 04 | 0 |
| JYU01OVE | JYU01001 | 600 | TORKBNM | | TRANSACTION TYPE NAME | 1 | LBL | N | | 05 | 0 |
| JYU01OVE | JYU01001 | 700 | NOUYMD | | DELIVERY DATE | 1 | TXT | D | | 08 | 0 |
| JYU01OVE | JYU01001 | 800 | JYUYMD | | ORDER DATE | 1 | TXT | D | | 08 | 0 |
| JYU01OVE | JYU01001 | 900 | SOKCD | | WAREHOUSE CODE | 1 | TXT | XX | | 02 | 0 |
| JYU01OVE | JYU01001 | 1000 | SOKNM | | WAREHOUSE NAME | 1 | LBL | N | | 10 | 0 |
| JYU01OVE | JYU01001 | 1500 | TNTCD | | CODE OF PERSON-IN-CHARGE | 1 | TXT | 9+ | | 03 | 0 |
| JYU01OVE | JYU01001 | 1600 | TNTNM | | NAME OF PERSON-IN-CHARGE | 1 | LBL | N | | 10 | 0 |
| JYU01OVE | JYU01001 | 1700 | DENBIK | | SLIP REMARKS | 1 | TXT | N | | 30 | 0 |
| JYU01OVE | JYU01001 | 1800 | C01A_ENT | | ENTER 01 | | BTN | B0 | | 00 | 0 |
| JYU01OVE | JYU01001 | 1900 | MEISELCHK | | DETAIL SELECTION | 5 | CHK | XX | | 01 | 0 |
| JYU01OVE | JYU01001 | 1910 | MEINO | M | DETAIL NUMBER | 5 | LBL | 9+ | | 02 | 0 |
| JYU01OVE | JYU01001 | 2000 | SHOCD | M | GOODS CODE | 5 | CMB | XX | | 07 | 0 |
| JYU01OVE | JYU01001 | 2100 | SHONM | M | GOODS NAME | 5 | LBL | N | | 15 | 0 |
| JYU01OVE | JYU01001 | 2200 | SHOTAN | M | UNIT OF GOODS | 5 | LBL | N | | 02 | 0 |
| JYU01OVE | JYU01001 | 2300 | JYUSU | M | QUANTITY OF ORDER | 5 | TXT | 9 | | 06 | 0 |
| JYU01OVE | JYU01001 | 2400 | JYUTAK | M | UNIT PRICE OF ORDER | 5 | TXT | 9+ | | 08 | 0 |
| JYU01OVE | JYU01001 | 2500 | JYUKIN | M | AMOUNT OF ORDER | 5 | LBL | 9 | | 10 | 0 |
| JYU01OVE | JYU01001 | 2520 | WKJYUTAK | M | WORK ORDER | 5 | LBL | 9 | | 07 | 1 |
| JYU01OVE | JYU01001 | 2600 | SUMJYUSU | | TOTAL NUMBER OF ORDER | 5 | LBL | 9 | | 06 | 0 |
| JYU01OVE | JYU01001 | 2700 | SUMJYUKIN | | TOTAL AMOUNT OF ORDER | 5 | LBL | 9 | | 10 | 0 |
| JYU01OVE | JYU01001 | 2800 | C05A_ENT | | ENTER 05 | 5 | BTN | B0 | | 00 | 0 |
| JYU01OVE | JYU01001 | 2900 | C07A_ENT | | ENTER 07 | 7 | BTN | B0 | | 00 | 0 |
| JYU01OVE | JYU01003 | 100 | NOUADR | | DELIVERY ADDRESS | 1 | TXT | N | | 30 | 0 |
| JYU01OVE | JYU01003 | 200 | KNKTEL | | PHONE NUMBER IN EMERGENCY | 1 | TXT | XX | | 12 | 0 |
| JYU01OVE | JYU01003 | 300 | HISKB01 | | DELIVERY SCALE 1 | 1 | CHK | B0 | | 01 | 0 |
| JYU01OVE | JYU01003 | 400 | HISKB02 | | DELIVERY SCALE 2 | 1 | CHK | B1 | | 01 | 0 |
| JYU01OVE | JYU01003 | 500 | HISKB03 | | DELIVERY SCALE 3 | 1 | CHK | B0 | | 01 | 0 |

FIG. 10

AATEST06: WORK ITEM TEST

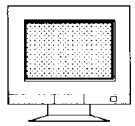

1 GROUP          BUTTON ID:B00     111
ENTERING HEAD KEY    MESSAGE ID:E105···ENTER

| PF KEY | ACTION ID | ACTION NAME | ACTION TYPE | ACTION INFORMATION 1 | ACTION INFORMATION 2 |
|---|---|---|---|---|---|
| F10 | FIN | TERMINATE | END | | |
| F12 | ENT | INPUT COMPLETED | GRP | G→5 | |

5 GROUP          BUTTON ID:B00
BODY-DETAIL TYPE    MESSAGE ID:I002···CONFIRM

| PF KEY | ACTION ID | ACTION NAME | ACTION TYPE | ACTION INFORMATION 1 | ACTION INFORMATION 2 |
|---|---|---|---|---|---|
| F01 | BFR | PREVIOUS PAGE | M_B | | |
| F02 | NXT | NEXT PAGE | M_N | | |
| F11 | ESC | DELETION | ESC | G→1 | |
| F12 | ENT | INPUT COMPLETED | DBU | 1 | |

F I G.  1 1

121 FORM INDEX TABLE OF LATEST DESIGNING INFORMATION

| PROGRAM ID | FORM ID | START UP |
|---|---|---|
| AATESTV2 | AATEST02 | ☐ |
| AATESTV2 | AATEST03 | ☑ |
| AATESTV2 | AATEST04 | ☐ |
| AATESTV2 | ABCDEF01 | ☑ |
| AATESTV3 | AATEST05 | ☑ |
| AATESTVE | AATEST06 | ☑ |
| AKT010VE | AKT01001 | ☑ |
| AKT010VE | JYU01002 | ☐ |
| AKT020VE | JYU01004 | ☑ |
| FMS081VE | Fms08102 | ☑ |
| JYU010VE | JYU01001 | ☑ |
| JYU010VE | JYU01003 | ☐ |
| JYU014VE | JYU01004 | ☑ |
| JYU014VE | TEST1005 | ☐ |
| JYU020VE | JYU02001 | ☑ |
| JYU030VE | JYU03001 | ☑ |
| JYU040VE | JYU04001 | ☑ |
| JYU110VE | JYU11001 | ☑ |
| JYU130VE | JYU13001 | ☑ |
| JYU140VE | JYU14001 | ☑ |
| JYU210VE | JYU01001 | ☑ |
| JYU210VE | JYU01003 | ☐ |
| KIM010VE | KIM01001 | ☑ |
| KIM010VE | KIM01002 | ☐ |
| KIM010VE | KIM01003 | ☐ |
| MAL002VE | MALTST03 | ☑ |
| MALTEST1 | MALTST01 | ☑ |
| MALTEST1 | MALTST02 | ☐ |
| OOSUGIVE | OOSUGI01 | ☑ |
| QVQ010VE | QVQ01001 | ☑ |
| SAI010VE | JYU01001 | ☑ |
| SAI010VE | JYU01003 | ☐ |
| SAI010VE | SAI01050 | ☐ |
| SAI010VE | SAI01070 | ☐ |
| TEST10 | JYU01003 | ☑ |
| TEST1208 | TEST1208 | ☑ |
| TST001VE | TST00101 | ☑ |

FIG. 12

131 FORM INDEX TABLE OF LATEST DESIGNING INFORMATION

| FORM ID | FORM NAME | FORM INDEX | TYPE | REMARKS |
|---|---|---|---|---|
| AATEST01 | WORK ITEM TEST | 69 | 13 | |
| AATEST02 | WORK ITEM TEST 2 | 71 | 13 | |
| AATEST03 | PROBLEM CONFIRMATION SCREEN | 73 | 11 | |
| AATEST04 | PROBLEM CONFIRMATION SUBSCREEN | 74 | 11 | |
| AATEST05 | TEST 98/04/22 | 78 | 11 | |
| AATEST06 | PATENT FORM | 85 | 11 | |
| AATEST07 | WORK ITEM TEST (98/09/24) | 80 | 11 | |
| ABCDEF01 | MODEL MASTER MAINTENANCE | 31 | 12 | |
| AKT01001 | QuiQpro V2 TEST | 22 | 12 | |
| BBBBB | AAAAAAA | 16 | 13 | |
| FGSAIUC | ORDER INPUT SCREEN | 17 | 15 | |
| FMS06109 | | 2 | 12 | |
| Fms08102 | MODEL MASTER MAINTENANCE | 29 | 12 | |
| FMTEST01 | MODEL MASTER MAINTENANCE | 30 | 12 | |
| FORMTEST | MASTER MAINTENANCE | 38 | 12 | |
| JYU01001 | ORDER INPUT SCREEN (WITHOUT DEPARTMENT) | 1 | 13 | |
| JYU01002 | PLURAL FORM TEST | 19 | 11 | |
| JYU01003 | ORDER DETAIL INPUT | 24 | 12 | |
| JYU01004 | PLURAL DETAIL TESTS | 37 | 13 | |
| JYU02001 | ORDER INPUT SCREEN (WITH DEPARTMENT) | 18 | 13 | |
| JYU03001 | INTER-PG COMMUNICATIONS TEST | 20 | 11 | |
| JYU04001 | CLIENT INQUIRY | 23 | 15 | |
| Jyu1 | ORDER INPUT SCREEN | 14 | 12 | |
| JYU11001 | ORDER INPUT (3EXE) | 32 | 13 | |
| JYU110VB | ORDER COPY | 88 | 22 | |
| JYU13001 | INTER-PG COMMUNICATIONS TEST(3EXE) | 34 | 15 | |
| JYU14001 | CLIENT INQUIRY(3EXE) | 33 | 15 | |
| KIM01001 | TEST FORM 1 | 61 | 13 | |
| KIM01002 | TEST FORM 2 | 62 | 13 | |
| KIM01003 | TEST FORM 3 | 63 | 12 | |
| KIM02001 | TEST FORM 1 | 59 | 13 | |
| KIM02002 | TEST FORM 2 | 60 | 13 | |
| MALTST01 | MAL TEST 01 | 64 | 12 | |
| MALTST02 | MAL TEST 02 | 65 | 13 | |
| MALTST03 | MAL TEST 03 | 66 | 12 | |
| MTSU101 | FORM GENERATION TEST | 25 | 15 | |
| OOSUG101 | TEST | 77 | 12 | |
| QVQ01001 | DRAWING DATA RETRIEVAL | 57 | 16 | |
| SAT01050 | RE-MOCK-UP TEST | 82 | 12 | |
| SAT01070 | RE-MOCK-UP TEST GROUP ADDITION | 83 | 13 | |
| TEST1005 | DETAIL PLURAL TESTS | 81 | 13 | |
| TEST1208 | TEST (FKS1208) | 58 | 13 | |
| TEST1234 | TEST 02 | 36 | 12 | |
| TST00101 | TEST OSUGI | 79 | 12 | |
| tst02101 | MANAGEMENT OF COURSE MEMBERS | 76 | 11 | |

FIG. 13

141 ACTION TABLE OF LATEST DESIGNING INFORMATION

| FORM INDEX | GROUP ID | MASSAGE ID | BUTTON ID |
|---:|---|---|---|
| 78 | 4 | E105 | B010 |
| 78 | 7 | I002 | B010 |
| 79 | 7 | I002 | B009 |
| 80 | 1 | E105 | B009 |
| 80 | 4 | I002 | B004 |
| 81 | 0 | I009 | B001 |
| 81 | 1 | I001 | B006 |
| 81 | 5 | I011 | B015 |
| 81 | 7 | I002 | B004 |
| 82 | 6 | E105 | B014 |
| 83 | 1 | E105 | B003 |
| 83 | 5 | E105 | B003 |
| 85 | 1 | E105 | B009 |
| 85 | 4 | E105 | B010 |
| 85 | 5 | I002 | B004 |
| 100002 | 1 | I002 | B003 |
| 100002 | 4 | I001 | B001 |

FIG. 14

161 GROUP ACTION LISTING TABLE OF LATEST DESIGNING INFORMATION

| FORM INDEX | GROUP INDEX | PF KEY | ACTION ID | ACTION TYPE | ACTION INFORMATION 1 | ACTION INFORMATION 2 |
|---|---|---|---|---|---|---|
| | 841 | F10 | FIN | END | | |
| | 841 | F12 | ENT | GRP | 5 | |
| | 845 | F01 | BFR | M.B | | |
| | 845 | F02 | NXT | M.N | | |
| | 845 | F09 | ESC | ESC | 1 | |
| | 845 | F12 | ENT | DBU | 1 | |
| | 851 | F10 | FIN | END | | |
| | 851 | F12 | ENT | GRP | 5 | |
| | 854 | F11 | ESC | ESC | 1 | |
| | 854 | F12 | ENT | GRP | 5 | |
| | 855 | F01 | BFR | M.B | | |
| | 855 | F02 | NXT | M.N | | |
| | 855 | F11 | ESC | ESC | 1 | |
| | 855 | F12 | ENT | DBU | 1 | |
| | 1941 | | FIN | END | | |
| | 1941 | | HLP | HLP | | |
| | 1941 | | ENT | GRP | 5 | |
| | 1945 | | HLP | HLP | | |
| | 1945 | | MNS | EXE | NX0001VE | |
| | 1945 | | PLS | FRM | NBD01103 | 1234123456789011 |
| | 1945 | | ENT | GRP | 7 | |
| | 1945 | | ESC | ESC | 1 | |
| | 1945 | | FIN | END | | |
| | 1945 | | NXT | M.N | | |
| | 1945 | | COD | COD | | |
| | 1945 | | BFR | M.B | | |
| | 1947 | | ENT | GRP | 1 | |
| | 1947 | | HLP | HLP | | |
| | 1947 | | ESC | ESC | 5 | |
| | 2071 | | ENT | GRP | 7 | |
| | 2071 | | COD | COD | | |
| | 2071 | | HLP | HLP | | |
| | 2077 | | FIN | END | | |
| | 2077 | | HLP | HLP | | |
| | 2077 | | ENT | FRM | NBD01101 | 5 |
| | 2077 | | ESC | ESC | 1 | |
| | 2081 | | HLP | HLP | | |
| | 2081 | | COD | COD | | |
| | 2081 | | ENT | GRP | 7 | |
| | 2087 | | FIN | END | | |
| | 2087 | | HLP | HLP | | |
| | 2087 | | ENT | END | | |

FIG. 16

AATEST06: WORK ITEM TEST

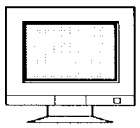

181 ACTION DEFINITION TABLE OF LATEST DESIGNING INFORMATION

1 GROUP  BUTTON ID:B009
ENTERING HEAD KEY  MESSAGE ID:E105···ENTER

| PF KEY | ACTION ID | ACTION NAME | ACTION TYPE | ACTION INFORMATION 1 | ACTION INFORMATION 2 |
|---|---|---|---|---|---|
| F10 | FIN | TERMINATE | END | | |
| F12 | ENT | INPUT COMPLETED | GRP | G→5 | |

4 GROUP  BUTTON ID:B010
BODY-CARD TYPE  MESSAGE ID:E105···ENTER

| PF KEY | ACTION ID | ACTION NAME | ACTION TYPE | ACTION INFORMATION 1 | ACTION INFORMATION 2 |
|---|---|---|---|---|---|
| F11 | ESC | DELETION | ESC | G→1 | |
| F12 | ENT | INPUT COMPLETED | GRP | G→5 | |

5 GROUP  BUTTON ID:B004
BODY-DETAIL TYPE  MESSAGE ID:I002···CONFIRM

| PF KEY | ACTION ID | ACTION NAME | ACTION TYPE | ACTION INFORMATION 1 | ACTION INFORMATION 2 |
|---|---|---|---|---|---|
| F01 | BFR | PREVIOUS PAGE | M_B | ↺ | |
| F02 | NXT | NEXT PAGE | M_N | ↻ | |
| F11 | ESC | DELETION | ESC | G→1 | |
| F12 | ENT | INPUT COMPLETED | DBU | 1 | |

F I G. 1 7

181 INPUT/OUTPUT INFORMATION DEFINITION TABLE OF LATEST DESIGNING INFORMATION

| | | | | | | | | | | | |
|---|---|---|---|---|---|---|---|---|---|---|---|
| AATEST05 | 400 | C04A_ENT | | ENTER 04 POINT | 4 | | BTN | B0 | 00 | 00 | 0 |
| AATEST05 | 500 | C07A_ENT | | ENTER 07 POINT | 7 | | BTN | B0 | 00 | 00 | 0 |
| AATEST06 | 100 | CSTCD | | CUSTOMER CODE | 1 | | TXT | D | 06 | 00 | 0 |
| AATEST06 | 200 | CSTNM | | CUSTOMER NAME | 1 | | LBL | N | 20 | 00 | 0 |
| AATEST06 | 300 | C01A_ENT | | ENTER 01 POINT | 4 | | BTN | B0 | 00 | 00 | 0 |
| AATEST06 | 350 | C04A_ENT | | ENTER 04 POINT | 4 | | BTN | B0 | 00 | 00 | 0 |
| AATEST06 | 400 | COSCD | M | COURSE CODE | 5 | | TXT | XX | 06 | 12 | 0 |
| AATEST06 | 600 | COSDTE | M | NUMBER OF DAYS OF COURSE | W | | TXT | 9+ | 09 | 00 | 0 |
| AATEST06 | 700 | COSBIL | M | COURSE FEE | W | | TXT | 9+ | 07 | 00 | 0 |
| AATEST06 | 800 | COSYMD | | DATE OF COURSE | 5 | | TXT | D | 08 | 52 | 0 |
| AATEST06 | 900 | C05A_ENT | | ENTER 05 POINT | 5 | | BTN | B0 | 00 | 00 | 0 |
| AATEST07 | 100 | CSTCD | | CUSTOMER CODE | 1 | | TXT | D | 06 | 00 | 0 |
| AATEST07 | 200 | CSTNM | | CUSTOMER NAME | 1 | | LBL | N | 20 | 00 | 0 |

F I G. 1 8

| NO. | ITEM JAPANESE NAME | G | I | ITEM ALPHA-NUMERIC NAME | TYPE | ATTRIBUTE | NUMBER OF DIGITS | NUMBER OF DECIMAL DIGITS | MAX LENGTH | FORMAT | T | I | REQUIRED INPUT | C | CODE ID | DISPLAY ITEM ALPHA-NUMERIC NAME | REMARKS | RELATION | CHECK |
|---|---|---|---|---|---|---|---|---|---|---|---|---|---|---|---|---|---|---|---|
| 1 | CUSTOMER CODE | 1 | | CSTCD | TEXT | DATE/TIME | 06 | 00 | 00 | | 0 | 0 | | | | | | | |
| 2 | CUSTOMER NAME | 1 | | CSTNM | LABEL | JAPANESE | 20 | 00 | 00 | | | | | | | | | | |
| 3 | ENTER 01 POINT | 1 | | C01A_ENT | COMMAND BUTTON | BUTTON OFF | 00 | 00 | 00 | | 0 | 0 | | | | | | | |
| 4 | COURSE CODE | 5 | | COSCD | TEXT | ", OTHERS | 06 | 00 | 00 | | 0 | 0 | | | | | | | |
| 5 | COURSE NAME | 5 | | COSNM | TEXT | JAPANESE | 20 | 00 | 00 | | 0 | 0 | | | | | | | |
| 6 | NUMBER OF DAYS FOR COURSE | W | | COSDTE | LABEL | NUMERIC, + | 09 | 00 | 00 | #,##0 | 0 | 0 | | | | | | | |
| 7 | COURSE FEE | W | | COSBIL | TEXT | ALPHA-NUMERIC, SYMBOL | 07 | 00 | 00 | | 0 | 0 | | | | | | | |
| 8 | DATE OF COURSE | W | | COSYMD | COMMAND BOX | DATE/TIME | 06 | 00 | 00 | yy/mm/dd | 0 | 0 | | | | | | | |
| 9 | ENTER 05 POINT | 5 | | C05A_ENT | COMMAND BUTTON | BUTTON OFF | 00 | 00 | 00 | | 0 | 0 | | | | | | | |

FIG. 20

| NO. | ITEM JAPANESE NAME | G | I. | ITEM ALPHA-NUMERIC NAME | TYPE | ATTRIBUTE | NUMBER OF DIGITS | NUMBER OF DECIMAL DIGITS | MAX LENGTH | FORMAT | T | I | REQUIRED INPUT | C | CODE ID | DISPLAY ITEM ALPHA-NUMERIC NAME | REMARKS | RELATION | CHECK |
|---|---|---|---|---|---|---|---|---|---|---|---|---|---|---|---|---|---|---|---|
| 1 | CUSTOMER CODE | 1 | | CSTCD | TEXT | DATE/TIME | 06 | 00 | 00 | | 0 | 0 | | | | | | | |
| 2 | CUSTOMER NAME | 1 | | CSTNM | LABEL | JAPANESE | 20 | 00 | 00 | | 0 | 0 | | | | | | | |
| 3 | ENTER 01 POINT | 1 | | C01A_ENT | COMMAND BUTTON | BUTTON OFF | 00 | 00 | 00 | | 0 | 0 | | | | | | | |
| 4 | ENTER 04 POINT | 4 | | C04A_ENT | COMMAND BUTTON | BUTON OFF | 00 | 00 | 00 | | 0 | 0 | | | | | | | |
| 5 | COURSE NAME | 5 | DETAIL | COSNM | TEXT | JAPANESE | 20 | 00 | 00 | | 0 | 0 | | | | | | | |
| 6 | NUMBER OF DAYS FOR COURSE | W | DETAIL | COSDTE | LABEL | NUMERIC, + | 09 | 00 | 00 | #, ##0 | 0 | 0 | | | | | | | |
| 7 | COURSE FEE | W | DETAIL | COSBIL | TEXT | ALPHA-NUMERIC, SYMBOL | 07 | 00 | 00 | | 0 | 0 | | | | | | | |
| 8 | DATE OF COURSE | W | | COSYMD | COMMAND BOX | DATE/TIME | 06 | 00 | 00 | yy/mm/dd | 0 | 0 | | | | | | | |
| 9 | ENTER 05 POINT | 5 | | C05A_ENT | COMMAND BUTTON | BUTTON OFF | 00 | 00 | 00 | | 0 | 0 | | | | | | | |

| TYPE | BEFORE CHANGE | AFTER CHANGE |
|---|---|---|
| SYSNAME | ○ | ○ |
| KAISYAMEI | ○ | ○ |
| GROUP CONTEST | ○ | ○ |
| PROGRAM NAME | ○ | ○ |
| ITEM NAME | ○ | ○ |
| NAME | ○ | ○ |

(NAME OF DEFINITION FOR ACTION)

FIG. 22

L_Z_FORM 231

| PROCESS | NEW FORM ID | OLD FORM ID | NEW GROUP ID | OLD GROUP ID |
|---------|-------------|-------------|--------------|--------------|
| ADD     | ○           |             |              |              |
| DLT     |             | ○           |              |              |
| UPD     | ○           | ○           |              | ○            |

※1 TYPE = 'UPD' WHEN START-UP FROM IS CHANGED, AND WHEN LEADING GROUP IS CHANGED ALTHOUGH START-UP FORM IS NOT CHANGED.

FIG. 23A

L_Z_GROUP 232

| PROCESS | NEW FORM ID | NEW GROUP ID | DETAIL FILE |
|---------|-------------|--------------|-------------|
| ADD     | ○           | ○            | "M" or " "  |
| DLT     | ○           | ○            | "M" or " "  |

"M" : DETAIL TRANSACTION FILE ADDED
" " : DETAIL TRANSACTION FILE NOT ADDED
"M" : DETAIL TRANSACTION FILE REDUCED
" " : DETAIL TRANSACTION FILE NOT REDUCED

DETERMINED DEPENDING ON ADDITION OR DELETION OF GROUP, AND DEPENDING ON ASSOCIATION WITH INCREASE OR DECREASE OF DETAIL TRANSACTION FILE

FIG. 23B

L_Z_ACTION 233

| PROCESS | FORM ID | GROUP ID | ACTION ID |
|---------|---------|----------|-----------|
| ADD     | ○       | ○        | ○         |
| DLT     | ○       | ○        | ○         |

※2 IT IS DETERMINED THAT ACTION HAS BEEN DELETED OR ADDED WHEN MATCHING CONDITIONS NOT SATISFIED IN ALL OF FORM ID, GROUP ID, ACTION TYPE, ACTION INFORMATION 1, AND ACTION INFORMATION 2

FIG. 23C

L_Z_ITEM                    241

| PROCESS | FORM ID | GROUP ID | ITEM ID | LEVEL |
|---------|---------|----------|---------|-------|
| ADD     | ○       | ○        | ○       | ○     |
| DLT     | ○       | ○        | ○       | ○     |

※3 IT IS DETERMINED THAT ITEM HAS BEEN DELETED OR ADDED WHEN MATCHING CONDITIONS NOT SATISFIED IN ALL OF FORM ID, GROUP ID, ITEM ID, LEVEL, TYPE, AND ATTRIBUTE

F I G.  2 4

{FORM NUMBER} IS EXPRESSED BY 2 LOWER DIGITS OF FORM ID TO BE CHANGED IN DESIGN
{FILE NUMBER} REFERS TO NUMBER OF FILE USED FOR FORM TO BE CHANGED IN DESIGN
{GROUP NAME} REFERS TO GROUP NAME TO BE CHANGED IN DESIGN
{ACTION NAME} REFERS TO ACTION NAME TO BE CHANGED IN DESIGN
{GROUP NUMBER} REFERS TO GROUP NUMBER TO BE CHANGED IN DESIGN
{FORM ID} REFERS TO FORM ID TO BE CHANGED IN DESIGN
{TRANSACTION TYPE} IS EXPRESSED BY M WHEN ITEM TO BE CHANGED IN DESIGN IS DETAIL,
AND BY T WHEN ITEM TO BE CHANGED IN DESING IS CARD.
{ITEM ID} REFERS TO ITEM ID TO BE CHANGED IN DESIGN
{DETAIL TYPE} IS EXPRESSED BY M WHEN ITEM TO BE CHANGED IN DESIGN IS DETAIL,
AND BY T WHEN ITEM TO BE CHANGED IN DESIGN IS CARD.

| OBJECT TO BE CHANGED IN DESIGN | PROCEDURE | RETRIEVED CHARACTER STRING | WHEN THERE ARE OTHER LINES TO BE PROCESSED THAN DETECTED LINE |
|---|---|---|---|
| FORM | G0100_OPEN_RTN<br>G1100_PR_CTL<br>G8010_CLOSE_RTN | Case" {FORM NUMBER}"<br>DFNUM{FILE NUMBER}=FreeFile<br>Close#DFNUM{FILE NUMBER} | CURRENT LINE AND ALL CODES IN Case ←(1)<br>CURRENT LINE AND SUBSEQUENT 3 lines ←(2)<br>←(3) |
| GROUP | G0100_OPEN_RTN<br>G1100_PF_CTL<br>G8010_CLOSE_RTN | Case F{GROUP NAME}<br>DFNUM{FILE NUMBER}=FreeFile<br>Close#DFNUM{FILE NUMBER} | CURRENT LINE AND ALL CODES IN Case<br>CURRENT LINE AND SUBSEQUENT 3 lines |
| ACTION | G11{FORM NUMBER}_GRP{GROUP NUMBER} | Case A{ACTION NAME} | CURRENT LINE AND ALL CODES IN Case ←(4) |
| ITEM | ANY PROCEDURE | {FORM ID}{TRANSACTION TYPE}{ITEM ID}<br>{DETAIL TYPE}{FORM NUMBER}{ITEM ID} | ←(5) |

F I G. 2 5

```
274   Dim I_I As Integer              'FOR 'FOR... NEXT'
275
276   Call G5306_BODY_M_TTR_SELECT1(FRM)
277   If F_OK_FLG = "OK" Then
278     AATESTO6_T.COSYND = 00700_SGET(Q_DS_AATESTO6TTR. "DATE OF COURSE")
279     Q_ret = 00600_DS_CLOSE(Q_DS_AATESTO6TTR)  'DYNASET CLOSE
280   Else
281     AATESTO6_T.COSYND = ""
282   End If
283   Put #DFNUM1, 1, AATESTO6_T
284
285   Call G5306_BODY_M_NTR_SELECT1(FRM)
286   If F_OK_FLG = "OK" Then
287     I_I = 0
288     Do While Q_ret = True
289       I_I = I_I + 1
290       AATESTO6_M.COSCD = 00700_SGET(Q_DS_AATESTO6NTR. "COURSE CODE")
291       AATESTO6_M.COSNM = 00700_SGET(Q_DS_AATESTO6NTR. "COURSE NAME")          DELETED BECAVSE THIS SATISFIES 4
292       AATESTO6_M.COSDTE = 00700_NGET(Q_DS_AATESTO6NTR. "NUMBER OF DAYS FOR COURSE")
293       AATESTO6_M.COSBIL = 00700_NGET(Q_DS_AATESTO6NTR. "COURSE FEE")
294       AATESTO6_M.T_CRLF = Chr(13) & Chr(10)
295       Put #DFNUM2, I_I, AATESTO6_M
296       Q_ret = 00500_FETCH(Q_DS_AATESTO6NTR)
297     Loop
298     AATESTO6_T.MAX_ADDRESS = I_I
299     Q_ret = 00600_DS_CLOSE(Q_DS_AATESTO6NTR)  'DYNASET CLOSE
300   Else
301     AATESTO6_M.COSCD = ""
302     AATESTO6_M.COSNM = ""
303     AATESTO6_M.COSDTE = ""                                  DELETED BECAVSE THIS SATISFIES 4
304     AATESTO6_M.COSBIL = ""
305     AATESTO6_T.MAX_ADDRESS = 0
306     Put #DFNUM2, 1, AATESTO6_M
307   End If
308   Put #DFNUM1, 1, AATESTO6_T
309 End Sub
```

FIG. 26A

```
310 '*****************************************************************
311 '*      AATEST06_T  TABLE  SELECT  PROCESS                G5306 * (***)
312 '*****************************************************************
313 Sub G5306_HEAD_KEY_TTR_SELECT1(FRM As Form)
314     Dim I_SQL As String
315 '
316     I_SQL = "SELECT * FROM AATEST06_T"
317     Q_ret = Q0300_DECLARE(Q_DB_MOQ. Q_DS_AATEST06TTR. I_SQL. False)
318     Select Case Q_ret
319         Case True  'NORMAL TERMINATION
320             F_OK_FLG = "OK"
321         Case Else  'NORMAL TERMINATION
322             F_OK_FLG = "NG"
323     End Select
324 End Sub
325 '*****************************************************************
326 '*      AATEST06_T  TABLE  SELECT  PROCESS                G5306 * (***)
327 '*****************************************************************
328 Sub G5306_BODY_M_TTR_SELECT1(FRM As Form)
329     Dim I_SQL As String
330 '
331     I_SQL = "SELECT * FROM AATEST06_T"
332     Q_ret = Q0300_DECLARE(Q_DB_MOQ. Q_DS_AATEST06TTR. I_SQL. False)
333     Select Case Q_ret
334         Case True  'NORMAL TERMINATION
335             F_OK_FLG = "OK"
336         Case Else  'NORMAL TERMINATION
337             F_OK_FLG = "NG"
338     End Select
339 End Sub
340 '*****************************************************************
341 '*      AATEST06_M  TABLE  SELECT  PROCESS                G5306 * (***)
342 '*****************************************************************
343 Sub G5306_BODY_M_MTR_SELECT1(FRM As Form)
344     Dim I_SQL As String
345 '
346     I_SQL = "SELECT * FROM AATEST06_M"
347     Q_ret = Q0300_DECLARE(Q_DB_MOQ. Q_DS_AATEST06MTR. I_SQL. False)
348     Select Case Q_ret
349         Case True  'NORMAL TERMINATION
350             F_OK_FLG = "OK"
351         Case Else  'NORMAL TERMINATION
352             F_OK_FLG = "NG"
353     End Select
354 End Sub
355 '*****************************************************************
356 '*      DB  UPDATING  PROCESS                             G7106 * (***)
357 '*****************************************************************
358 Sub G7106_DB_UPD_GRP5(FRM As Form)
359     Dim I_I As Integer
360 '
361     W_ERRMSG = 0: W_ERRSTR = "": F_OK_FLG = "OK"
362 '
363     Call G7106_AATEST06_GRP5_T_SELECT
364     If F_OK_FLG = "OK" Then
```

FIG. 26B

```
456      End Select
457    End Sub
458    '*************************************************************  G7106 * (***)
459    '*      AATEST06_M TABLE DELETE PROCESS
460    '*************************************************************
461    Sub G7106_AATEST06_GRP5_M_DELETE()
462      Dim I_SQL As String
463
464      I_SQL = "DELETE FROM AATEST06_M"
465
466      Q_ret = 00400_EXECUTE(Q_DB_MOD, Q_DS_AATEST06MTR, I_SQL, TRAN_MODE)
467      Select Case Q_ret
468        Case True  'NORMAL TERMINATION
469
470        Case Else  'UNSUCCESSFUL ISSUE OF SQL STATEMENT
471          F_OK_FLG = "NG"
472          W_ERRMSG = S001
473          W_ERRSTR = Q_SQLMSG
474      End Select
475    End Sub
476    '*************************************************************  G7106 * (***)
477    '*      AATEST06_M TABLE INSERT PROCESS
478    '*************************************************************
479    Sub G7106_AATEST06_GRP5_M_INSERT()
480      Dim I_SQL_1 As String
481      Dim I_SQL_2 As String
482
483      I_SQL_1 = "INSERT INTO AATEST06_M("
484      I_SQL_1 = I_SQL_1 & "COURSE CODE"
485      I_SQL_2 = I_SQL_2 & "'" & Trim(AATEST06_M.COSCD) & "',"
486      I_SQL_1 = I_SQL_1 & "COURSE NAME",
487      I_SQL_2 = I_SQL_2 & "'" & Trim(AATEST06_M.COSNM) & "',"
488
489      I_SQL_1 = I_SQL_1 & "NUMBER OF DAYS FOR COURSE"
490      I_SQL_2 = I_SQL_2 & Trim(AATEST06_M.COSDIE) & ","
491
492      I_SQL_1 = I_SQL_1 & "COURSE FEE"
493      I_SQL_2 = I_SQL_2 & Trim(AATEST06_M.COSBIL)
494      I_SQL_1 = I_SQL_1 & ")values ("
495      I_SQL_2 = I_SQL_2 & ")"
496
```

"DELELECTED BECAUSE THIS SATISFIES 4" → (lines 489–490)

FIG. 27A

```
497     Q_ret = Q0400_EXECUTE(Q_DB_MOQ, Q_DS_AATEST06MTR, I_SQL_1 & I_SQL_2, TRAN_MODE)
498     Select Case Q_ret
499         Case True   'NORMAL TERMINATION
500         '
501         Case Else   'UNSUCCESSFUL ISSUE OF SQL STATEMENT
502             F_OK_FLG = "NG"
503             W_ERRMSG = S001
504             W_ERRSTR = Q_SQLMSG
505     End Select
506 End Sub
507 '*****************************************************************
508 '*    TERMINATING  PROCESS                               G8000  *
509 '*****************************************************************
510 Private Sub G8000_END_RTN(FRM As Form)
511     Call G8010_CLOSE_RTN
512     W_CMDSTR = "S700"
513     Call Z7000_LINK_RTN(FRM, W_CMDSTR)
514     Call Z0900_FINL_RTN
515     End 'END OF WORK APPLICATION
516 End Sub
517 '*****************************************************************
518 '*    FILE  CLOSING  PROCESS                             G8010  *
519 '*****************************************************************
520 Private Sub G8010_CLOSE_RTN()
521     Q_ret = Q0200_DISCON(Q_DB_SERVER)
522     Q_ret = Q0200_DISCON(Q_DB_MOQ)          '(★★★)
523     Close #DFNUM1    'CLOSING AATEST06 (TRANSACTION)
524     Close #DFNUM2    'CLOSING AATEST06 (DETAIL)
525 End Sub
526 '*****************************************************************
527 '*    SCREEN  EDITING  PROCESS  (BODY_M)                 G9106  *
528 '*****************************************************************
529 Private Sub G9106_DSPDATA_BODY_M(FRM As Form)
530     Dim I_CNT As Integer    'FOR 'FOR...NEXT'
531 '
532     For I_CNT = 0 To F_L_MAX
533         If AATEST06_T.MAX_ADDRESS >= AATEST06_T.SENTO + I_CNT Then
534             Get #DFNUM2, AATEST06_T.SENTO + I_CNT, AATEST06_M
535             Call GX106_GRP5_M_TO_FORM(FRM, I_CNT)
536             Call G9206_PROTECT_BODY_M(FRM, I_CNT)
537         Else
538             Do Until I_CNT > F_L_MAX
539                 Call D0720_TXT_LINECLR(FRM, I_CNT)
540                 Call G9206_PROTECT_BODY_M(FRM, I_CNT)
541                 I_CNT = I_CNT + 1
542             Loop
543         End If
544     Next I_CNT
545 End Sub
546 '*****************************************************************
```

FIG. 27B

```
547  '*        BODY_M PROTECT SETTING PROCESS              G9206 *
548  '***********************************************************
549  Private Sub G9206_PROTECT_BODY_M(FRM As Form, I_CNT As Integer)
550      Call G9206_PROTECT_BODY_M_OFF(FRM, I_CNT)
551  End Sub
552  '***********************************************************
553  '*        BODY_M PROTECT SETTING PROCESS              G9206 *
554  '***********************************************************
555  Private Sub G9206_PROTECT_BODY_M_OFF(FRM As Form, I_I As Integer)
556      Call D0810_TABSTOP_PUT(FRM. F_M(I_I). M06COSCD). "_". "")    'COURSE CODE PROTECT RELEASE
557      Call D0810_TABSTOP_PUT(FRM. F_M(I_I). M06COSNM). "_". "")    'COURSE NAME PROTECT RELEASE ←"DELETED BECAUSE
558  End Sub                                                                                       THIS SATISFIES 5"
559  '***********************************************************
560  '*        BODY_M PROTECT SETTING PROCESS              G9206 *
561  '***********************************************************
562  Private Sub G9206_PROTECT_BODY_M_ON(FRM As Form, I_I As Integer)
563      Call D0810_TABSTOP_PUT(FRM. F_M(I_I). M06COSCD): "1")        'COURSE CODE PROTECT RELEASE
564      Call D0810_TABSTOP_PUT(FRM. F_M(I_I). M06COSNM). "1")        'COURSE NAME PROTECT ←"DELETED BECAUSE
565  End Sub                                                                                THIS SATISFIES 5"
566  '***********************************************************
567  '*   TRANSACTION FILE (BODY_M) UPDATEING PROCESS      G9306 *
568  '***********************************************************
569  Private Sub G9306_SETTRN_BODY_M(FRM As Form)
570      Dim I_CNT As Integer            'FOR 'FOR···NEXT'
571      Dim I_MAX_ADDRESS As Integer
572  .
```

FIG. 28A

```
573     F_MEISAI_FLG = 0
574     For I_CNT = 0 To F_L_MAX
575         If AATEST06_T.MAX_ADDRESS >= AATEST06_T.SENTO + I_CNT Then
576             Get #DFNUM2, AATEST06_T.SENTO + I_CNT, AATEST06_M
577         Else
578             AATEST06_M.COSDTE = 0
579             AATEST06_M.COSBIL = 0
580             AATEST06_M.T_CRLF = Chr(13) & Chr(10)
581         End If
582         Call GX106_GRP5_M_TO_TRN(FRM, I_CNT)
583         Put #DFNUM2, AATEST06_T.SENTO + I_CNT, AATEST06_M
584         If D0440_CLR_LINE_CHK(FRM, I_CNT) = False Then
585             I_MAX_ADDRESS = AATEST06_T.SENTO + I_CNT
586         End If
587     Next I_CNT
588     If AATEST06_T.MAX_ADDRESS < I_MAX_ADDRESS Then
589         AATEST06_T.MAX_ADDRESS = I_MAX_ADDRESS
590         Put #DFNUM1, 1, AATEST06_T
591     End If
592 End Sub
593 '*****************************************************************
594 '*   EXTENDED  TABLE  DEFINITION                          10000 *
595 '*****************************************************************
596 Private Sub 10000_CODE_OPT_INT()
597     Call D6001_CD_OPT_INIT    ' "CODE REFERENCE EXTENDING
598 '                                FUNCTION INITIAL PROCESS"
599     Call D6002_CODE_CNT       ' OBTAINING NUMBER OF CODES
600 End Sub
601 '*****************************************************************
602 '*CODE ALLOTMENT AND ADDED ITEMS SCREEN SET               11000 *
603 '*****************************************************************
604 Sub 11000_OPT_MOJI_SET(FRM As Form, K_IX, M_GYO As Integer)
605 End Sub
606 '*****************************************************************
607 '*   CODE  REFERENCE  WORK  ALLOTMENT                     16000 *
608 '*****************************************************************
609 Public Sub 16000_CODE_SHOW(FRM As Form, KEY_CODE As Integer, RCODE As Integer)
610     If F_ACTION_ID <> A_COD Then
611         RCODE = 1
612         Exit Sub
613     End If
614     Select Case F_ACTIVE_ITEM_ID
615         Case Else       'CODE REFRENCE MAIN CALL
616             Call D6000_CODE_SHOW(FRM, KEY_CODE, RCODE)
617     End Select
618 End Sub
```

FIG. 28B

```
 1 Attribute VB_Name = "AATEST_BAS"
 2 Option Explicit
 3 '**********************************************************************
 4 '*                                                                    *
 5 '*   SYSTEM  NAME  :  QuiQpro-VB                                      *
 6 '*                                                                    *
 7 '*   PROGRAM NAME :  WORK ITEM TEST                                   *
 8 '*                                     < AATESTVE >                   *
 9 '*   Copyright(C)                                                     *
10 '*                                                                    *
11 '*  DATE                   NAME             VERSION                   *
12 '*  99/01/21 19:09:53                       V001                      *
13 '**********************************************************************
14 '**********************************************************************
15 '*     INITIAL PROCESS                                       G0000    *
16 '**********************************************************************
17 Sub G0000_INIT_RTN(FRM As Form)
18     Static G0000_FIRST As Integer
19 '
20     If G0000_FIRST <> 999 Then
21         Call Z2000_BAT_MODE_SET(FRM, True, S005)
22         Call G0001_PROGRAM_INIT(FRM)
23         Call Z2000_BAT_MODE_SET(FRM, False)
24         G0000_FIRST = 999
25     End If
26 End Sub
27 '**********************************************************************
28 '*     PROGRAM INITIAL PROCESS                               G0001    *
29 '**********************************************************************
30 Private Sub G0001_PROGRAM_INIT(FRM As Form)
31     Call G0100_OPEN_RTN              'FILE OPENING PROCESS
32 '
33     'CODE DEFINITION INITIAL PROCESS
34     Call I0000_CODE_OPT_INT
35 '    Call G5306_HEAD_KEY_CREATE(FRM)       'COMMENT RELEASED
36 '    Get #DFNUM1, 1, AATEST06_T           'COMMENT RELEASED
37 '    Call GX106_GRP1_T_TO_FORM(FRM)       'COMMENT RELEASED
38     Call D0050_GROUP_CHANGE(FRM, F_HEAD_KEY)
39 End Sub
40 '**********************************************************************
41 '*     FILE OPENING PROCESS                                  G0100    *
42 '**********************************************************************
43 Private Sub G0100_OPEN_RTN()
44     Q_DB_CODE = Q_DB_SERVER       'DB DEFINITION FOR REFERENCING CODE
45     Q_ret = Q0100_CONNECT(Q_DB_SERVER, Q_USER_ID, Q_PW)   'DEFAULT DB
46     Q_ret = Q0100_CONNECT(Q_DB_MOQ, Q_USER_ID, Q_PW)     'DB FOR MOCK-UP(***)
47     DFNUM1 = FreeFile                         'OBTAINING AATEST06 NUMBER
48     DFNAME1 = CStr(App.Path) & "¥AATEST06.TTR" 'STORING AATEST06 NAME
49     DFLEN1 = Len(AATEST06_T)
50     Open DFNAME1 For Random As #DFNUM1 Len = DFLEN1
51     DFNUM2 = FreeFile                         'OBTAINING AATEST06 NUMBER
52     DFNAME2 = CStr(App.Path) & "¥AATEST06.MTR" 'STORING AATEST06 NAME
53     DFLEN2 = Len(AATEST06_M)
54     Open DFNAME2 For Random As #DFNUM2 Len = DFLEN2
55 End Sub
```

FIG. 29A

```
56  '*******************************************************
57  '*  ALLOTTING PROCESS FOR EACH KEY-DOWN FORM      G1100 *
58  '*******************************************************
59  Sub G1100_PF_CTL(FRM As Form, KeyCode As Integer, SHIFT As Integer)
60    Dim I_RCODE As Integer
61    Call I6000_CODE_SHOW(FRM, KeyCode, I_RCODE)  'CODE REFERENCE MAIN
62    Call D7000_HLP_SHOW(FRM)                     'INQUIRY SUBMENU
63    Select Case Mid$(FRM.Tag, FORMNO_S, 2)       'DETERMINATION OF FORM ID
64      Case "06"                                  'PROCESS OF FORM 06
65        Select Case F_GROUP
66          Case F_HEAD_KEY
67            Call G1106_GRP1(FRM, KeyCode, SHIFT)
68          Case F_BODY_CARD
69            Call G1106_GRP4(FRM, KeyCode, SHIFT)     }— "DELETED BECAUSE THIS SATISFIES 1"
70          Case F_BODY_M
71            Call G1106_GRP5(FRM, KeyCode, SHIFT)
72        End Select
73    End Select
74  End Sub
75  '*******************************************************
76  '*  ALLOTTING PROCESS FOR EACH HEAD_KEY BUTTON   G1106 *
77  '*******************************************************
78  Private Sub G1106_GRP1(FRM As Form, S_CODE As Integer, SHIFT As Integer)
79    Select Case F_ACTION_ID
80      Case A_FIN                   'TERMINATING PROCESS
81        Call G8000_END_RTN(FRM)
82      Case A_ENT                   'INPUT COMPLETING PROCESS
83        Call Z2000_BAT_MODE_SET(FRM, True, S005)
84        Call G4006_GRP1_CHK(FRM)             'HEAD_KEY.ITEM TOTAL CHECK
85        If F_OK_FLG = "OK" Then
86          Call GX106_GRP1_T_TO_TRN(FRM)
87          Put #DFNUM1, 1, AATEST06_T
88          Call G5306_BODY_M_CREATE(FRM)
89          Get #DFNUM1, 1, AATEST06_T
90          Call GX106_GRP5_T_TO_FORM(FRM)
91          AATEST06_T.SENTO = 1
```

FIG. 29B

```
 92              Put #DFNUM1, 1, AATEST06_T
 93              Call G9106_DSPDATA_BODY_M(FRM)
 94              Call D0050_GROUP_CHANGE(FRM, F_BODY_M)
 95          End If
 96          Call Z2000_BAT_MODE_SET(FRM, False)
 97      Case Else
 98          Call Z1000_MSGSEND(FRM, S002, "")
 99      End Select
100 End Sub
101 '*************************************************************
102 '*     ALLOTTING PROCESS FOR EACH BODY_CARD          G1106 *
        '*     BUTTON (O6 SCREEN.)
103 '*************************************************************
104 Private Sub G1106_GRP4(FRM As Form, S_CODE As Integer, SHIFT As Integer)
105      Select Case F_ACTION_ID
106          Case A_ESC              'DELETING PROCESS
107              Call D0050_GROUP_CHANGE(FRM, F_HEAD_KEY)
108          Case A_ENT              ' INPUT COMPLETING PROCESS
109              Call Z2000_BAT_MODE_SET(FRM, True, S005)
110              Call G4006_GRP4_CHK(FRM)         'BODY_CARD ITEM TOTAL CHECK
111              If F_OK_FLG = "OK" Then
112                  Call G5306_BODY_M_CREATE(FRM)
113                  Get #DFNUM1, 1, AATEST06_T
114                  Call GX106_GRP5_T_TO_FORM(FRM)
115                  AATEST06_T.SENTO = 1
116                  Put #DFNUM1, 1, AATEST06_T
117                  Call G9106_DSPDATA_BODY_M(FRM)
118                  Call D0050_GROUP_CHANGE(FRM, F_BODY_M)
119              End If
120              Call Z2000_BAT_MODE_SET(FRM, False)
121          Case Else
122              Call Z1000_MSGSEND(FRM, S002, "")
123      End Select
124 End Sub
```

FIG. 30A

```
125 '*****************************************************************
126 '*     ALLOTTING PROCESS FOR EACH BODY_M BUTTON      G1106 *
127 '*****************************************************************
128 Private Sub G1106_GRP5(FRM As Form, S_CODE As Integer, SHIFT As Integer)
129     Select Case F_ACTION_ID
130         Case A_BFR                  'PROCESS ON PREVIOUS PAGE
131             Call G1206_BEFORE_RTN(FRM, F_BODY_M)
132         Case A_NXT                  'PROCESS ON NEXT PAGE
133             Call G1206_NEXT_RTN(FRM, F_BODY_M)
134         Case A_ESC                  'DELETING PROCESS
135             Call D0050_GROUP_CHANGE(FRM, F_HEAD_KEY)
136         Case A_ENT                  'INPUT COMPLETING PROCESS
137             Call Z2000_BAT_MODE_SET(FRM, True, S005)
138             Call G4006_GRP5_CHK(FRM)          'BODY_M ITEM TOTAL CHECK
139             If F_OK_FLG = "OK" Then
140                 Call GX106_GRP5_T_TO_TRN(FRM)
141                 Put #DFNUM1, 1, AATEST06_T
142                 Call G9306_SETTRN_BODY_M(FRM)
143                 Call G7106_DB_UPD_GRP5(FRM)
144                 If F_OK_FLG = "OK" Then
145                     Get #DFNUM1, 1, AATEST06_T
146                     Call GX106_GRP1_T_TO_FORM(FRM)
147                     Call D0050_GROUP_CHANGE(FRM, F_HEAD_KEY)
148                 End If
149             End If
150             Call Z2000_BAT_MODE_SET(FRM, False)
151         Case Else
152             Call Z1000_MSGSEND(FRM, S002, "")
153     End Select
154 End Sub
155 '*****************************************************************
156 '*     PROCESS ON PREVIOUS PAGE                       G1206 *
157 '*****************************************************************
158 Private Sub G1206_BEFORE_RTN(FRM As Form, I_GRP As Integer, Optional I_DSP_FLG)
159     If IsMissing(I_DSP_FLG) Then
160         If AATEST06_T.SENTO > 1 Then
161             Call G4006_GRP5_CHK(FRM)          'BODY_M ITEM TOTAL CHECK
162             If F_OK_FLG = "OK" Then
163                 Call GX106_GRP5_T_TO_TRN(FRM)
164                 Put #DFNUM1, 1, AATEST06_T
165                 Call G9306_SETTRN_BODY_M(FRM)
166             Else
167                 Exit Sub
168             End If
169         Else
170             Call Z1000_MSGSEND(FRM, S003, "")
171             Exit Sub
172         End If
173     Else
174         If AATEST06_T.SENTO > 1 Then
175         Else
176             Call Z1000_MSGSEND(FRM, S003, "")
177             Exit Sub
178         End If
179     End If
180     AATEST06_T.SENTO = AATEST06_T.SENTO - F_L_MAX - 1
181     Put #DFNUM1, 1, AATEST06_T
182     Call G9106_DSPDATA_BODY_M(FRM)
```

FIG. 30B

```
183     Call D0050_GROUP_CHANGE(FRM, I_GRP)
184   End Sub
185 '*************************************************************
186 '*        PROCESS ON NEXT PAGE                       G1206 *
187 '*************************************************************
188 Private Sub G1206_NEXT_RTN(FRM As Form, I_GRP As Integer, Optional I_DSP_FLG)
189     If IsMissing(I_DSP_FLG) Then
190         F_MEISAI_FLG = 0
191         If AATEST06_T.MAX_ADDRESS >= AATEST06_T.SENTO + F_L_MAX Or D0440_CLR_LINE_CHK(FRM, F_L_MAX) = False Then
192             Call G4006_GRP5_CHK(FRM)              'BODY_N ITEM TOTAL CHECK(O6 SCREEN)
193             If F_OK_FLG = "OK" Then
194                 Call GX106_GRP5_T_TO_TRN(FRM)
195                 Put #DFNUM1, 1, AATEST06_T
196                 Call G9306_SETTRN_BODY_M(FRM)
197             Else
198                 Exit Sub
199             End If
200         Else
201             Call Z1000_MSGSEND(FRM, S004, "")
202             Exit Sub
203         End If
204     Else
205         If AATEST06_I.MAX_ADDRESS > AATEST06_T.SENTO + F_L_MAX Then
206         Else
207             Call Z1000_MSGSEND(FRM, S004, "")
208             Exit Sub
209         End If
210     End If
211     AATEST06_T.SENTO = AATEST06_T.SENTO + F_L_MAX + 1
212     Put #DFNUM1, 1, AATEST06_T
213     Call G9106_DSPDATA_BODY_M(FRM)
214     Call D0050_GROUP_CHANGE(FRM, I_GRP)
215 End Sub
216 '*************************************************************
217 '*        ITEM CHECKING PROCESS                      G1300 *
218 '*************************************************************
219 Sub G1300_ITEM_CTL(FRM As Form, K_IX As Integer, C_IX As Integer)
220     Dim RTNCODE As Integer
221     Call D6100_CODE_CHK(FRM, K_IX, C_IX, RTNCODE)
222 End Sub
```

FIG. 31A

```
223 '*****************************************************************
224 '*      HEAD_KEY ITEM TOTAL CHECK  (06 SCREEN)         G4006 *
225 '*****************************************************************
226 Private Sub G4006_GRP1_CHK(FRM As Form)
227     W_ERRMSG = 0: W_ERRSTR = "": F_OK_FLG = "OK"
228 '
229     Call D0400_GROUP_CHECK(FRM)       'SAME GROUP RELATED PROCESS
230     If F_OK_FLG = "NG" Then           'GROUP CHECK ERROR DETECTED
231        Call Z1000_MSGSEND(FRM, S001, W_ERRSTR)
232        Exit Sub
233     End If
234     Call G4006_GRP1_CHK1(FRM)         'HEAD_KEY ITEM CHECK ROUTINE
235     If F_OK_FLG = "NG" Then           'HEAD_KEY RELATED CHECK
236        Call Z1000_MSGSEND(FRM, W_ERRMSG, W_ERRSTR)
237        Call D0330_SETFOCUS(FRM, F_ERR)
238     End If
239 End Sub
240 '*****************************************************************
241 '*      HEAD_KEY ITEM CHECK ROUTINE (06 SCREEN)        G4006 *
242 '*****************************************************************
243 Private Sub G4006_GRP1_CHK1(FRM As Form)
244 End Sub
245 '*****************************************************************
246 '*      BODY_CARD ITEM TOTAL CHECK (06 SCREEN)         G4006 *
247 '*****************************************************************
248 Private Sub G4006_GRP4_CHK(FRM As Form)
249     W_ERRMSG = 0: W_ERRSTR = "": F_OK_FLG = "OK"
250 '
251     Call D0400_GROUP_CHECK(FRM)       'SAME GROUP RELATED PROCESS
252     If F_OK_FLG = "NG" Then           'GROUP CHECK ERROR DETECTED
253        Call Z1000_MSGSEND(FRM, S001, W_ERRSTR)
254        Exit Sub
255     End If
256     Call G4006_GRP4_CHK1(FRM)         'BODY_CARD ITEM CHECK ROUTINE
257     If F_OK_FLG = "NG" Then           'BODY_CARD RELATED CHECK
258        Call Z1000_MSGSEND(FRM, W_ERRMSG, W_ERRSTR)
259        Call D0330_SETFOCUS(FRM, F_ERR)
260     End If
261 End Sub
262 '*****************************************************************
263 '*      BODY_CARD ITEM CHECK ROUTINE (06 SCREEN)       G4006 *
264 '*****************************************************************
265 Private Sub G4006_GRP4_CHK1(FRM As Form)
266 End Sub
267 '*****************************************************************
268 '*      BODY_M ITEM TOTAL CHECK (06 SCREEN)            G4006 *
269 '*****************************************************************
270 Private Sub G4006_GRP5_CHK(FRM As Form)
271     W_ERRMSG = 0: W_ERRSTR = "": F_OK_FLG = "OK"
272 '
273     Call D0400_GROUP_CHECK(FRM)       'SAME GROUP RELATED PROCESS
```

FIG. 31B

```
547      Call G8010_CLOSE_RTN
548      W_CMDSTR = "S700"
549      Call Z7000_LINK_RTN(FRM, W_CMDSTR)
550      Call Z0900_FINL_RTN
551      End 'END OF WORK APPLICATION
552 End Sub
553 '***********************************************************************
554 '*      FILE CLOSING PROCESS                                  G8010 *
555 '***********************************************************************
556 Private Sub G8010_CLOSE_RTN()
557      Q_ret = 00200_DISCON(Q_DB_SERVER)
558      Q_ret = 00200_DISCON(Q_DB_MOQ)          (★★★)
559      Close #DFNUM1    'CLOSING AATEST06 (TRANSACTION)
560      Close #DFNUM2    'CLOSING AATEST06 (DETAIL)
561 End Sub
562 '***********************************************************************
563 '*      SCREEN EDITING PROCESS (BODY_M)                       G9106 *
564 '***********************************************************************
565 Private Sub G9106_DSPDATA_BODY_M(FRM As Form)
566      Dim I_CNT As Integer       'FOR 'FOR...NEXT'
567 '
568      For I_CNT = 0 To F_L_MAX
569           If AATEST06_T.MAX_ADDRESS >= AATEST06_T.SENTO + I_CNT Then
570               Get #DFNUM2, AATEST06_T.SENTO + I_CNT, AATEST06_M
571               Call GX106_GRP5_M_TO_FORM(FRM, I_CNT)
572               Call G9206_PROTECT_BODY_M(FRM, I_CNT)
573           Else
574               Do Until I_CNT > F_L_MAX
575                   Call D0720_TXT_LINECLR(FRM, I_CNT)
576                   Call G9206_PROTECT_BODY_M(FRM, I_CNT)
577                   I_CNT = I_CNT + 1
578               Loop
579           End If
580      Next I_CNT
581 End Sub
582 '***********************************************************************
583 '*      BODY_M PROTECT SETTING PROCESS                        G9206 *
584 '***********************************************************************
585 Private Sub G9206_PROTECT_BODY_M(FRM As Form, I_CNT As Integer)
586      Call G9206_PROTECT_BODY_M_OFF(FRM, I_CNT)
587 End Sub
```

FIG. 32A

```
588 '***********************************************************
589 '*     BODY_M  PROTECT  SETTING  PROCESS              G9206 *
590 '***********************************************************
591 Private Sub G9206_PROTECT_BODY_M_OFF(FRM As Form, I_I As Integer)
592     Call D0810_TABSTOP_PUT(FRM, F_M(I_I, M06COSCD), " ")    'COURSE CODE PROTECT RELEASE
593 End Sub
594 '***********************************************************
595 '*     BODY_M  PROTECT  SETTING  PROCESS              G9206 *
596 '***********************************************************
597 Private Sub G9206_PROTECT_BODY_M_ON(FRM As Form, I_I As Integer)
598     Call D0810_TABSTOP_PUT(FRM, F_M(I_I, M06COSCD), "1")    'COURSE CODE PROTECT
599 End Sub
600 '***********************************************************
601 '* TRANSACTION FILE (BODY_M) UPDATING  PROCESS        G9306 *
602 '***********************************************************
603 Private Sub G9306_SETTRN_BODY_M(FRM As Form)
604     Dim I_CNT As Integer        'FOR 'FOR...NEXT'
605     Dim I_MAX_ADDRESS As Integer
606 '
607     F_MEISAI_FLG = 0
608     For I_CNT = 0 To F_L_MAX
609         If AATEST06_T.MAX_ADDRESS >= AATEST06_T.SENTO + I_CNT Then
610             Get #DFNUM2, AATEST06_T.SENTO + I_CNT, AATEST06_M
611         Else
612             AATEST06_M.COSDTE = 0
613             AATEST06_M.COSBIL = 0
614             AATEST06_M.T_CRLF = Chr(13) & Chr(10)
615         End If
616         Call GX106_GRP5_M_TO_TRN(FRM, I_CNT)
617         Put #DFNUM2, AATEST06_T.SENTO + I_CNT, AATEST06_M
618         If D0440_CLR_LINE_CHK(FRM, I_CNT) = False Then
619             I_MAX_ADDRESS = AATEST06_T.SENTO + I_CNT
620         End If
621     Next I_CNT
622     If AATEST06_T.MAX_ADDRESS < I_MAX_ADDRESS Then
623         AATEST06_T.MAX_ADDRESS = I_MAX_ADDRESS
624         Put #DFNUM1, 1, AATEST06_T
625     End If
626 End Sub
627 '***********************************************************
628 '*     EXTENDED TABLE DEFINITION                      10000 *
629 '***********************************************************
630 Private Sub I0000_CODE_OPT_INT()
631     Call D6001_CD_OPT_INIT    '"CODE REFERENCE EXTENDING FUNCTION INITIAL PROCESS"
632 '
633     Call D6002_CODE_CNT       ' OBTAINING CODE NUMBER
634 End Sub
635 '***********************************************************
636 '* CODE ALLOTMENT AND ADDED ITEM SCREEN SET           11000 *
637 '***********************************************************
```

FIG. 32B

332 DELETED PROCEDURE LIST BOX

| SERIAL NUMBER (5 DIGITS) | PROCEDURE NAME |
|---|---|
| | |

FIG. 33A

331 ADDED PROCEDURE LIST BOX

| SERIAL NUMBER (5 DIGITS) | PROCEDURE NAME |
|---|---|
| 00001 | G1106_GRP4(FRM, KeyCard, SHIFT) |
| 00002 | G4006_GRP4_CHK(FRM) |
| 00003 | G5306_BODY_M_CREATE(FRM) |
| 00004 | G9106_DSPDATA_BODY_M(FRM) |
| 00005 | G4006_GRP4_CHK1(FRM) |

SINCE THESE TWO PROCEDURES ARE IN PROGRAM DESCRIBING WORK SPECIFICATION, THEY DO NOT HAVE TO BE ADDED AGAIN

FIG. 33B

```
1  Attribute VB_Name = "AATEST_BAS"
2  Option Explicit
3  '****************************************************************
4  '*                                                              *
5  '*  SYSTEM NAME : QuiOpro-VB                                    *
6  '*                                                              *
7  '*  PROGRAM NAME : WORK ITEM TEST                               *
8  '*                            < AATESTVE >                      *
9  '*  Copyright(C)                                                *
10 '*                                                              *
11 '*  DATE             NAME            VERSION                    *
12 '##### ADD START RE-MOCK-UP 99/01/21 19:09:53 #####  ⎫
13 '*  99/01/21 19:09:53              V001              ⎬ ADDED    *
14 '##### ADD E N D RE-MOCK-UP 99/01/21 19:09:53 #####  ⎭
15 '*  99/01/04 14:59:33              V001                         *
16 '****************************************************************
17 '****************************************************************
18 '*     INITIAL PROCESS                                   G0000  *
19 '****************************************************************
20 Sub G0000_INIT_RTN(FRM As Form)
21     Static G0000_FIRST As Integer
22 '
23     If G0000_FIRST <> 999 Then
24         Call Z2000_BAT_MODE_SET(FRM, True, S005)
25         Call G0001_PROGRAM_INIT(FRM)
26         Call Z2000_BAT_MODE_SET(FRM, False)
27         G0000_FIRST = 999
28     End If
29 End Sub
30 '****************************************************************
31 '*     PROGRAM INITIAL PROCESS                           G0001  *
32 '****************************************************************
33 Private Sub G0001_PROGRAM_INIT(FRM As Form)
34     Call G0100_OPEN_RTN              'FILE OPENING PROCESS
35 '
36     'CODE DEFINITION INITIAL PROCESS
37     Call I0000_CODE_OPT_INT
38 '     Call G5306_HEAD_KEY_CREATE(FRM)      "COMMENT RELEASED
39 '     Get #DFNUM1, 1, AATEST06_T           FOR DATA INITIAL
40 '     Call GX106_GRP1_T_TO_FORM(FRM)       DISPLAY PROGRAM"
41     Call D0050_GROUP_CHANGE(FRM, F_HEAD_KEY)
42 End Sub
```

FIG. 34A

```
43  '******************************************************************
44  '*      FILE OPENING PROCESS                              G0100 *
45  '******************************************************************
46  Private Sub G0100_OPEN_RTN()
47      Q_DB_CODE = Q_DB_SERVER          'CODE DEFINITION INITIAL PROCESS
48      Q_ret = Q0100_CONNECT(Q_DB_SERVER, Q_USER_ID, Q_PW)      'DEFAULT DB
49      Q_ret = Q0100_CONNECT(Q_DB_MOQ, Q_USER_ID, Q_PW)      'MDB FOR MOCK-UP (***)
50      DFNUM1 = FreeFile                             'OBTAINING TRANSACTION NUMBER
51      DFNAME1 = CStr(App.Path) & "¥AATEST06.TTR"  'OBTAINING TRANSACTION NAME
52      DFLEN1 = Len(AATEST06_T)
53      Open DFNAME1 For Random As #DFNUM1 Len = DFLEN1
54      DFNUM2 = FreeFile                             'OBTAINING DETAIL NUMBER
55      DFNAME2 = CStr(App.Path) & "¥AATEST06.MTR"  'STORING DETAIL NAME
56      DFLEN2 = Len(AATEST06_M)
57      Open DFNAME2 For Random As #DFNUM2 Len = DFLEN2
58  End Sub
59  '******************************************************************
60  '* ALLOTTING PROCESS FOR EACH KEY-DOWN FORM'              G1100 *
61  '******************************************************************
62  Sub G1100_PF_CTL(FRM As Form, KeyCode As Integer, SHIFT As Integer)
63      Dim I_RCODE As Integer
64      Call I6000_CODE_SHOW(FRM, KeyCode, I_RCODE) 'CODE REFERENCE MAIN
65      Call D7000_HLP_SHOW(FRM)                    ' INQUIRY SUBMENU
66      Select Case Mid$(FRM.Tag, FORMNO_S, 2)      ' DETERMINATION OF FROM ID
67          Case "06"                               ' PROCESS OF FORM 06
68              Select Case F_GROUP
69  '##### ADD STARTRE-MOCK-UP99/01/21 19:09:53 #####        ⎫
70                  Case F_BODY_CARD                                ⎬ ADDED
71                      Call G1106_GRP4(FRM, KeyCode, SHIFT)
72  '##### ADD E N DRE-MOCK-UP99/01/21 19:09:53 #####        ⎭
73                  Case F_HEAD_KEY
74                      Call G1106_GRP1(FRM, KeyCode, SHIFT)
75                  Case F_BODY_M
76                      Call G1106_GRP5(FRM, KeyCode, SHIFT)
77              End Select
78      End Select
79  End Sub
80  '******************************************************************
81  '*    ALLOTTING PROCESS FOR EACH HEAD-KEY                 G1106 *
        '     BOTTON (06 SCREEN)
82  '******************************************************************
83  Private Sub G1106_GRP1(FRM As Form, S_CODE As Integer, SHIFT As Integer)
84      Select Case F_ACTION_ID
85          Case A_FIN              ' TERMINATING PROCESS
86              Call G8000_END_RTN(FRM)
87          Case A_ENT              ' INPUT COMPLETING PROCESS
88              Call Z2000_BAT_MODE_SET(FRM, True, S005)
89              Call G4006_GRP1_CHK(FRM)         'HEAD_KEY ITEM TOTAL CHECK
90              If F_OK_FLG = "OK" Then
91                  Call GX106_GRP1_T_TO_TRN(FRM)
```

FIG. 34B

```
 92                Put #DFNUM1, 1, AATEST06_T
 93                Call G5306_BODY_N_CREATE(FRM)
 94                AATEST06_T.SENTO = 1
 95                Put #DFNUM1, 1, AATEST06_T
 96                Call G9106_DSPDATA_BODY_N(FRM)
 97                Call D0050_GROUP_CHANGE(FRM, F_BODY_N)
 98            End If
 99            Call Z2000_BAT_MODE_SET(FRM, False)
100        Case Else
101            Call Z1000_MSGSEND(FRM, S002, "")
102    End Select
103 End Sub
104 '#### ADD START RE-MOCK-UP 99/01/21 19:09:53 ####
105 '*************************************************
106 '*ALLOTTING PROCESS FOR EACH BODYCARD BUTTON(O6 SCREEN)G1106 *
107 '*************************************************
108 Private Sub G1106_GRP4(FRM As Form, S_CODE As Integer, SHIFT As Integer)
109    Select Case F_ACTION_ID
110        Case A_ESC           'DELETING PROCESS
111            Call D0050_GROUP_CHANGE(FRM, F_HEAD_KEY)
112        Case A_ENT           'INPUT COMPLETING PROCESS
113            Call Z2000_BAT_MODE_SET(FRM, True, S005)
114            Call G4006_GRP4_CHK(FRM)            'BODY_CARD ITEM TOTAL CHECK
115            If F_OK_FLG = "OK" Then
116                Call G5306_BODY_N_CREATE(FRM)
117                Get #DFNUM1, 1, AATEST06_T
118                Call GX106_GRP5_T_TO_FORM(FRM)
119                AATEST06_T.SENTO = 1
120                Put #DFNUM1, 1, AATEST06_T
121                Call G9106_DSPDATA_BODY_N(FRM)
122                Call D0050_GROUP_CHANGE(FRM, F_BODY_N)
123            End If
124            Call Z2000_BAT_MODE_SET(FRM, False)
125        Case Else
126            Call Z1000_MSGSEND(FRM, S002, "")
127    End Select
128 End Sub
129 '#### ADD E N D RE-MOCK-UP 99/01/21 19:09:53 ####
```

} ADDED

FIG. 35A

```
130 '*********************************************************************
131 '*      ALLOTTING PROCESS FOR EACH BODY_M                    G1106 *
131 '*      BUTTON (O6 SCREEN )
132 '*********************************************************************
133 Private Sub G1106_GRP5(FRM As Form. S_CODE As Integer. SHIFT As Integer)
134     Select Case F_ACTION_ID
135         Case A_BFR              'PROCESS ON PREVIOUS PAGE
136             Call G1206_BEFORE_RTN(FRM. F_BODY_M)
137         Case A_NXT              'PROCESS ON NEXT PAGE
138             Call G1206_NEXT_RTN(FRM. F_BODY_M)
139         Case A_ESC              'DELETING PROCESS
140             Call D0050_GROUP_CHANGE(FRM. F_HEAD_KEY)
141         Case A_ENT              'INPUT COMPLETING PROCESS
142             Call Z2000_BAT_MODE_SET(FRM. True. S005)
143             Call G4006_GRP5_CHK(FRM)         'BODY_M ITEM TOTAL CHECK
144             If F_OK_FLG = "OK" Then
145                 Call GX106_GRP5_T_TO_TRN(FRM)
146                 Put #DFNUM1. 1. AATEST06_T
147                 Call G9306_SETTRN_BODY_M(FRM)
148                 Call G7106_DB_UPD_GRP5(FRM)
149                 If F_OK_FLG = "OK" Then
150                     Get #DFNUM1. 1. AATEST06_T
151                     Call GX106_GRP1_T_TO_FORM(FRM)
152                     Call D0050_GROUP_CHANGE(FRM. F_HEAD_KEY)
153                 End If
154             End If
155             Call Z2000_BAT_MODE_SET(FRM. False)
156         Case Else
157             Call Z1000_MSGSEND(FRM. S002. "")
158     End Select
159 End Sub
160 '*********************************************************************
161 '*      PROCESS ON PREVIOUS PAGE                             G1206 *
162 '*********************************************************************
163 Private Sub G1206_BEFORE_RTN(FRM As Form. I_GRP As Integer. Optional I_DSP_FLG)
164     If IsMissing(I_DSP_FLG) Then
165         If AATEST06_T.SENTO > 1 Then
166             Call G4006_GRP5_CHK(FRM)         'BODY_M ITEM TOTAL CHECK
167             If F_OK_FLG = "OK" Then
168                 Call GX106_GRP5_T_TO_TRN(FRM)
169                 Put #DFNUM1. 1. AATEST06_T
170                 Call G9306_SETTRN_BODY_M(FRM)
171             Else
172                 Exit Sub
173             End If
174         Else
175             Call Z1000_MSGSEND(FRM. S003. "")
176             Exit Sub
177         End If
178     Else
179         If AATEST06_T.SENTO > 1 Then
180         Else
181             Call Z1000_MSGSEND(FRM. S003. "")
182             Exit Sub
```

FIG. 35B

```
183         End If
184      End If
185      AATEST06_T.SENTO = AATEST06_T.SENTO - F_L_MAX - 1
186      Put #DFNUM1, 1, AATEST06_T
187      Call G9106_DSPDATA_BODY_N(FRM)
188      Call D0050_GROUP_CHANGE(FRM, I_GRP)
189 End Sub
190 '***************************************************************
191 '*            PROCESS ON NEX PAGE                      G1206 *
192 '***************************************************************
193 Private Sub G1206_NEXT_RTN(FRM As Form, I_GRP As Integer, Optional I_DSP_FLG)
194      If IsMissing(I_DSP_FLG) Then
195          F_MEISAI_FLG = 0
196          If AATEST06_T.MAX_ADDRESS >= AATEST06_T.SENTO + F_L_MAX or D0440_CLR_LINE_CHK(FRM, F_L_MAX) = False Then
197              Call G4006_GRP5_CHK(FRM)                'BODY_N ITEM TOTAL CHECK
198              If F_OK_FLG = "OK" Then
199                  Call GX106_GRP5_T_TO_TRN(FRM)
200                  Put #DFNUM1, 1, AATEST06_T
201                  Call G9306_SETTRN_BODY_N(FRM)
202              Else
203                  Exit Sub
204              End If
205          Else
206              Call Z1000_MSGSEND(FRM, S004, "")
207              Exit Sub
208          End If
209      Else
210          If AATEST06_T.MAX_ADDRESS > AATEST06_T.SENTO + F_L_MAX Then
211          Else
212              Call Z1000_MSGSEND(FRM, S004, "")
213              Exit Sub
214          End If
215      End If
216      AATEST06_T.SENTO = AATEST06_T.SENTO + F_L_MAX + 1
217      Put #DFNUM1, 1, AATEST06_T
218      Call G9106_DSPDATA_BODY_N(FRM)
219      Call D0050_GROUP_CHANGE(FRM, I_GRP)
220 End Sub
221 '***************************************************************
222 '*            ITEM CHECKING PROCESS                    G1300 *
223 '***************************************************************
224 Sub G1300_ITEM_CTL(FRM As Form, K_IX As Integer, C_IX As Integer)
225      Dim RTNCODE As Integer
226      Call D6100_CODE_CHK(FRM, K_IX, C_IX, RTNCODE)
227 End Sub
```

FIG. 36A

```
228 '*****************************************************************
229 '*      HEAD_KEY ITEM TOTAL CHECK (O6 SCREEN)            G4006 *
230 '*****************************************************************
231 Private Sub G4006_GRP1_CHK(FRM As Form)
232     W_ERRMSG = 0: W_ERRSTR = "": F_OK_FLG = "OK"
233 '
234     Call D0400_GROUP_CHECK(FRM)       'SAME GROUP RELATED PROCESS
235     If F_OK_FLG = "NG" Then           'GROUP CHECK ERROR DETECTED
236         Call Z1000_MSGSEND(FRM, S001, W_ERRSTR)
237         Exit Sub
238     End If
239     Call G4006_GRP1_CHK1(FRM)         'HEAD_KEY ITEM CHECK ROUTINE
240     If F_OK_FLG = "NG" Then           'HEAD_KEY RELATED CHECK ERROR DETECTED
241         Call Z1000_MSGSEND(FRM, W_ERRMSG, W_ERRSTR)
242         Call D0330_SETFOCUS(FRM, F_ERR)
243     End If
244 End Sub
245 '*****************************************************************
246 '*      HEAD_KEY ITEM CHECK ROUTINE ( O6 SCREEN )         G4006 *
247 '*****************************************************************
248 Private Sub G4006_GRP1_CHK1(FRM As Form)
249
250
251
252 End Sub
253 '##### ADD START RE-MOCK-UP 99/01/21  19:09:53 #####
254 '*****************************************************************
255 '*      BODY_CARD ITEM TOTAL CHECK (O6 SCREEN )          G4006 *
256 '*****************************************************************
257 Private Sub G4006_GRP4_CHK(FRM As Form)
258     W_ERRMSG = 0: W_ERRSTR = "": F_OK_FLG = "OK"
259 '
260     Call D0400_GROUP_CHECK(FRM)       'SAME GROUP RELATED PROCESS
261     If F_OK_FLG = "NG" Then           'GROUP CHECK ERROR DETECTED
262         Call Z1000_MSGSEND(FRM, S001, W_ERRSTR)
263         Exit Sub
264     End If
265     Call G4006_GRP4_CHK1(FRM)         'BODY_CARD ITEM CHECK ROUTINE
266     If F_OK_FLG = "NG" Then           'BODY_CARD RELATED CHECK ERROR DETECTED
267         Call Z1000_MSGSEND(FRM, W_ERRMSG, W_ERRSTR)
268         Call D0330_SETFOCUS(FRM, F_ERR)
269     End If
270 End Sub
271 '*****************************************************************
272 '*      BODY_CARD ITEM CHECK ROUTINE ( O6 SCREEN )        G4006 *
273 '*****************************************************************
```

(lines 254–273) } ADDED

FIG. 36B

```
274 Private Sub G4006_GRP4_CHK1(FRM As Form)  ⎫ ADDED
275 End Sub                                   ⎭
276 '##### ADD E N DRE-MOCK-UP 99/01/21 19:09:53 #####
277 '***********************************************************
278 '*      BODY_M ITEM TOTAL CHECK (06 SCREEN)       G4006 *
279 '***********************************************************
280 Private Sub G4006_GRP5_CHK(FRM As Form)
281     W_ERRMSG = 0: W_ERRSTR = "": F_OK_FLG = "OK"
282 '
283     Call D0400_GROUP_CHECK(FRM)         'SAME GROUP RELATED PROCESS
284     If F_OK_FLG = "NG" Then             'GROUP CHECK ERROR DETECTED
285         Call Z1000_MSGSEND(FRM, S001, W_ERRSTR)
286         Exit Sub
287     End If
288     Call G4006_GRP5_CHK1(FRM)           'BODY_M ITEM CHECK ROUTINE
289     If F_OK_FLG = "NG" Then             'BODY_M RELATED CHECK ERROR DETECTED
290         Call Z1000_MSGSEND(FRM, W_ERRMSG, W_ERRSTR)
291         Call D0330_SETFOCUS(FRM, F_ERR)
292     End If
293 End Sub
294 '***********************************************************
295 '*      BODY_M ITEM CHECK ROUTINE                 G4006 *
296 '***********************************************************
297 Private Sub G4006_GRP5_CHK1(FRM As Form)
298 End Sub
299 '***********************************************************
300 '* EXTERNAL PROGRAM RECEIVING PROCESS             G5100 *
301 '***********************************************************
302 Sub G5100_JYUSIN_RTN(FRM As Form)
303 End Sub
304 '***********************************************************
305 '* TRANSACTION FILE GENERATING PROCESS            G5306 * (***)
306 '***********************************************************
307 Sub G5306_HEAD_KEY_CREATE(FRM AS Form)
308     Dim I_I As Integer          'FOR 'FOR…NEXT'
309 '
310     Call G5306_HEAD_KEY_TTR_SELECT1(FRM)
311     If F_OK_FLG = "OK" Then
312         AATEST06_T.CSTCD = Q0700_SGET(Q_DS_AATEST06TTR, "CUSTOMER CODE")
313         AATEST06_T.CSTNM = Q0700_SGET(Q_DS_AATEST06TTR, "CUSTOMER NAME")
314         Q_ret = Q0600_DS_CLOSE(Q_DS_AATEST06TTR)    'DYNASET CLOSE
315     Else
316
317         AATEST06_T.CSTCD = ""
318         AATEST06_T.CSTNM = ""
319
320
321
322
323     End If
324     Put #DFNUM1, 1, AATEST06_T
325 '
326 End Sub
```

FIG. 37A

```
327  '*******************************************************
328  '*   TRANSACTION FILE GENERATING PROCESS         G5306 * (***)
329  '*******************************************************
330  Sub G5306_BODY_N_CREATE(FRM AS Form)       'FOR... FOR... NEXT'
331     Dim I_I As Integer
332  .
333     Call G5306_BODY_N_TTR_SELECT1(FRM)
334     If F_OK_FLG = "OK" Then
335        AATEST06_T.COSYMD = 00700_SGET(Q_DS_AATEST06TTR, "COURSE DATE")
336        Q_ret = 00600_DS_CLOSE(Q_DS_AATEST06TTR)     'DYNASET CLOSE
337     Else
338        AATEST06_T.COSYMD = ""
339     End If
340     Put #DFNUM1, 1, AATEST06_T
341  .
342     Call G5306_BODY_N_NTR_SELECT1(FRM)
343     If F_OK_FLG = "OK" Then
344        I_I = 0
345        Do While Q_ret = True
346           I_I = I_I + 1
347           AATEST06_N.COSCD = 00700_SGET(Q_DS_AATEST06NTR, "COURSE CODE")
348  '#####  DLT START RE-MOCK-UP99/01/21 19:09:53 #####              ⎫
349           AATEST06_N.COSNM = 00700_SGET(Q_DS_AATEST06NTR, "COURSE NAME") ⎬ DELETED
350  '#####  DLT E N D RE-MOCK-UP99/01/21 19:09:53 #####              ⎭
351           AATEST06_N.COSDTE = 00700_NGET(Q_DS_AATEST06NTR, "NUMBER OF DAYS FOR COURSE")
352           AATEST06_N.COSBIL = 00700_NGET(Q_DS_AATEST06NTR, "COURSE FEE")
353           AATEST06_N.T_CRLF = Chr.(13) & Chr.(10)
354           Put #DFNUM2, I_I, AATEST06_N
355           Q_ret = 00500_FETCH(Q_DS_AATEST06NTR)
356        Loop
357        AATEST06_T.MAX_ADDRESS = I_I
358        Q_ret = 00600_DS_CLOSE(Q_DS_AATEST06NTR)     'DYNASET CLOSE
359     Else
360        AATEST06_N.COSCD = ""
361  '#####  DLT START RE-MOCK-UP 99/01/21 19:09:53 #####             ⎫
362           AATEST06_N.COSNM = ""                                   ⎬ DELETED
363  '#####  DLT E N D RE-MOCK-UP99/01/21 19:09:53 #####              ⎭
364        AATEST06_N.COSDTE = ""
```

FIG. 37B

```
547 '##### DLT START RE-MOCK-UP 99/01/21 19:09:53 #####  ⎫
548 '    I_SQL_1 = I_SQL_1 & "COURSE NAME"                ⎪
549 '    I_SQL_2 = I_SQL_2 & "'" & Trim(AATEST06_M.COSNM) & "'"  ⎬ DELETED
550 '##### DLT END RE-MOCK-UP 99/01/21 19:09:53 #####    ⎭
551
552     I_SQL_1 = I_SQL_1 & "NUMBER OF DAYS FOR COURSE"
553     I_SQL_2 = I_SQL_2 & Trim(AATEST06_M.COSDTE) & ","
554
555     I_SQL_1 = I_SQL_1 & "COURSE FEE"
556     I_SQL_2 = I_SQL_2 & Trim(AATEST06_M.COSBIL)
557     I_SQL_1 = I_SQL_1 & ") values ("
558     I_SQL_2 = I_SQL_2 & ")"
559 '
560     Q_ret = Q0400_EXECUTE(Q_DB_MOQ, Q_DS_AATEST06NTR, I_SQL_1 & I_SQL_2, TRAN_MODE)
561     Select Case Q_ret
562         Case True   'NORMAL TERMINATION
563
564         Case Else   'UNSUCCESSFUL ISSUE OF SQL STATEMENT
565             F_OK_FLG = "NG"
566             W_ERRMSG = S001
567             W_ERRSTR = Q_SQLMSG
568     End Select
569 End Sub
570 '*************************************************************
571 '*    TERMINATING PROCESS                              G8000 *
572 '*************************************************************
573 Private Sub G8000_END_RTN(FRM As Form)
574     Call G8010_CLOSE_RTN
575     W_CMDSTR = "S700"
576     Call Z7000_LINK_RTN(FRM, W_CMDSTR)
577     Call Z0900_FINL_RTN
578     End 'END OF WORK APPLICATION
579 End Sub
580 '*************************************************************
581 '*    FILE CLOSING PROCESS                             G8010 *
582 '*************************************************************
583 Private Sub G8010_CLOSE_RTN()
584     Q_ret = Q0200_DISCON(Q_DB_SERVER)
585     Q_ret = Q0200_DISCON(Q_DB_MOQ)         '(★★★)
586     Close #DFNUM1   'CLOSING AATEST06 (TRANSACTION)
587     Close #DFNUM2   'CLOSING AATEST06 (DETAIL)
588 End Sub
589 '*************************************************************
590 '*    SCREEN EDITING PROCESS (BODY_M)                  G9106 *
591 '*************************************************************
592 Private Sub G9106_DSPDATA_BODY_M(FRM As Form)
593     Dim I_CNT As Integer    'FOR 'FOR···NEXT'
594 '
595     For I_CNT = 0 To F_L_MAX
596         If AATEST06_T.MAX_ADDRESS >= AATEST06_T.SENTO + I_CNT Then
597             Get #DFNUM2, AATEST06_T.SENTO + I_CNT, AATEST06_M
598             Call GX106_GRP5_M_TO_FORM(FRM, I_CNT)
599             Call G9206_PROTECT_BODY_M(FRM, I_CNT)
600         Else
601             Do Until I_CNT > F_L_MAX
602                 Call D0720_TXT_LINECLR(FRM, I_CNT)
603                 Call G9206_PROTECT_BODY_M(FRM, I_CNT)
604                 I_CNT = I_CNT + 1
605             Loop
606         End If
607     Next I_CNT
608 End Sub
```

FIG. 38A

```
609 '*****************************************************
610 '*          BODY_N PROTECT SETTING PROCESS       G9206 *
611 '*****************************************************
612 Private Sub G9206_PROTECT_BODY_N_OFF(FRM As Form, I_CNT As Integer)
613     Call G9206_PROTECT_BODY_N_OFF(FRM, I_CNT)
614 End Sub
615 '*****************************************************
616 '*          BODY_N PROTECT SETTING PROCESS       G9206 *
617 '*****************************************************
618 Private Sub G9206_PROTECT_BODY_N_OFF(FRM As Form, I_I As Integer)
619     Call D0810_TABSTOP_PUT(FRM, F_N(I_I, M06COSCD), " ")          'COURSE CODE PROTECT RELEASE  ⎫
620 '#### DLT STARTRE-MOCK-UP 99/01/21 19:09:53 ####                                               ⎬ DELETED
621     Call D0810_TABSTOP_PUT(FRM, F_N(I_I, M06COSNM), " ")          'COURSE NAME PROTECT RELEASE ⎭
622 '#### DLT E N D RE-MOCK-UP 99/01/21 19:09:53 ####
623 End Sub
624 '*****************************************************
625 '*          BODY_N PROTECT SETTING PROCESS       G9206 *
626 '*****************************************************
627 Private Sub G9206_PROTECT_BODY_N_ON(FRM As Form, I_I As Integer)
628     Call D0810_TABSTOP_PUT(FRM, F_N(I_I, M06COSCD), "1")          'COURSE CODE PROTECT         ⎫
629 '#### DLT STARTRE-MOCK-UP 99/01/21 19:09:53 ####                                               ⎬ DELETED
630     Call D0810_TABSTOP_PUT(FRM, F_N(I_I, M06COSNM), "1")          'COURSE NAME PROTECT         ⎭
631 '#### DLT E N D RE-MOCK-UP 99/01/21 19:09:53 ####
632 End Sub
633 '*****************************************************
634 '* TRANSACTION FILE (BODY_M) UPDATING PROCESS    G9306 *
635 '*****************************************************
636 Private Sub G9306_SETTRN_BODY_N(FRM As Form)
637     Dim I_CNT As Integer           'FOR 'FOR ... NEXT'
```

FIG. 38B

| # | | | | | | |
|---|---|---|---|---|---|---|
| 1 | DESIGN CHANGE POINT ADDITION OF '4 GROUPS TO AATESTO6 FORM' IS ADDED | | | | | |
| 2 | | | | | | |
| 3 | DESIGN CHANGE POINT DELETION OF 'COSNN ITEM FROM GROUPS OF AATESTO6 FORM' IS DELETED | | | | | |
| 4 | | | | | | |
| 5 | RE-MOCK-UP | ADDITION | SUCCESS | BAS | LINE 13 | [ * 99/01/21 19:09:53                V001             *] |
| 6 | | | | | | |
| 7 | | | | | | |
| 8 | RE-MOCK-UP | ADDITION | SUCCESS | BAS | LINE 70 | Case F_BODY_CARD |
| 9 | RE-MOCK-UP | ADDITION | SUCCESS | BAS | LINE 71 |    Call G1106_GRP4(FRM. KeyCode. SHIFT) |
| 10 | | | | | | |
| 11 | | | | | | |
| 12 | RE-MOCK-UP | ADDITION | SUCCESS | BAS | LINE 105 | [ '******************* ALLOTTING PROCESS FOR EACH BODY_CARD BUTTON   G1106 ******] |
| 13 | RE-MOCK-UP | ADDITION | SUCCESS | BAS | LINE 106 | [ '*                                                                         *] |
| 14 | RE-MOCK-UP | ADDITION | SUCCESS | BAS | LINE 107 | [ '************************************************************************] |
| 15 | RE-MOCK-UP | ADDITION | SUCCESS | BAS | LINE 108 | Private Sub G1106_GRP4(FRM As Form. S_CODE As Integer. SHIFT As Integer) |
| 16 | RE-MOCK-UP | ADDITION | SUCCESS | BAS | LINE 109 | Select Case F_ACTION_ID |
| 17 | RE-MOCK-UP | ADDITION | SUCCESS | BAS | LINE 110 | Case A_ESC           'DELETING PROCESS |
| 18 | RE-MOCK-UP | ADDITION | SUCCESS | BAS | LINE 111 | Call D0050_GROUP_CHANGE(FRM. F_HEAD_KEY) |
| 19 | RE-MOCK-UP | ADDITION | SUCCESS | BAS | LINE 112 | Case A_ENT           'INPUT COMPLETING PROCESS |
| 20 | RE-MOCK-UP | ADDITION | SUCCESS | BAS | LINE 113 | Call Z2000_BAT_MODE_SET(FRM. True. S005)    'BODY_CARD ITEM TOTAL CHECK |
| 21 | RE-MOCK-UP | ADDITION | SUCCESS | BAS | LINE 114 | Call G4006_GRP4_CHK(FRM) |
| 22 | RE-MOCK-UP | ADDITION | SUCCESS | BAS | LINE 115 | If F_OK_FLG = "OK" Then |
| 23 | RE-MOCK-UP | ADDITION | SUCCESS | BAS | LINE 116 | Call G5306_BODY_N_CREATE(FRM) |
| 24 | RE-MOCK-UP | ADDITION | SUCCESS | BAS | LINE 117 | Get #DFNUM1. 1. AATESTO6_T |
| 25 | RE-MOCK-UP | ADDITION | SUCCESS | BAS | LINE 118 | Call GX106_GRP5_T_TO_FORM(FRM) |
| 26 | RE-MOCK-UP | ADDITION | SUCCESS | BAS | LINE 119 | AATESTO6_T.SENTO = 1 |
| 27 | RE-MOCK-UP | ADDITION | SUCCESS | BAS | LINE 120 | Put #DFNUM1. 1. AATESTO6_T |
| 28 | RE-MOCK-UP | ADDITION | SUCCESS | BAS | LINE 121 | Call G9105_OSPDATA_BODY_N(FRM) |
| 29 | RE-MOCK-UP | ADDITION | SUCCESS | BAS | LINE 122 | Call D0050_GROUP_CHANGE(FRM. F_BODY_N) |
| 30 | RE-MOCK-UP | ADDITION | SUCCESS | BAS | LINE 123 | End If |
| 31 | RE-MOCK-UP | ADDITION | SUCCESS | BAS | LINE 124 | Case Else |
| 32 | RE-MOCK-UP | ADDITION | SUCCESS | BAS | LINE 125 | Call Z2000_BAT_MODE_SET(FRM. False) |
| 33 | RE-MOCK-UP | ADDITION | SUCCESS | BAS | LINE 126 | Call Z1000_MSGSEND(FRM. S002. "") |
| 34 | RE-MOCK-UP | ADDITION | SUCCESS | BAS | LINE 127 | End Select |
| 35 | RE-MOCK-UP | ADDITION | SUCCESS | BAS | LINE 128 | End Sub |
| 36 | | | | | | |

METHOD FOR AUTOMATICALLY GENERATING CORRECTED PROGRAM INHERITED PROGRAM, AUTOMATIC PROGRAM GENERATION APPARATUS, AND STORAGE MEDIUM STORING PROGRAM FOR AUTOMATICALLY GENERATING CORRECTED PROGRAM INHERITED PROGRAM

BACKGROUND OF THE INVENTION

1. Field of the Invention

The present invention relates to a method for automatically generating a corrected program inherited program, an automatic program generation apparatus, and a storage medium storing a program for automatically generating a corrected program inherited program.

2. Description of the Related Art

An automatic generation program for automatically generating a program according to designing information has ben developed. However, since it is rather difficult for the current automatic generation program to generate a program applicable as is, an automatically generated program is normally corrected for practical use. After the automatically generated program is corrected, the designing information is changed, and a program is automatically generated according to the changed designing information. Since the program is automatically generated with a corrected code ignored, the same correction has to be made again to the automatically generated program.

To solve the above described problem, there has been an automatic generation program developed to have a subsequent automatically generated program automatically inherit a corrected code.

SUMMARY OF THE INVENTION

However, to protect a corrected portion when a program is automatically generated, it is necessary to clearly describe the corrected portion in an automatic generation program so that the program can recognize it, thereby complicating a program correcting operation.

The present invention aims at automatically generating a corrected portion inherited program without describing a corrected portion of the program.

The method for automatically generating a corrected program inherited program according to the first embodiment of the present invention automatically generates a program which inherits the contents of the correction in the corrected program by retrieving a changed portion of the program based on the contents of a change in the designing information, and adding or deleting the retrieved changed portion to or from the corrected program obtained by correcting the automatically generated program.

The method for automatically generating a program according to the second embodiment of the present invention automatically generates a program which inherits the contents of the correction in the corrected program by storing old designing information and the latest designing information, retrieving a changed portion of the program based on the old designing information and the latest designing information, and adding or deleting the retrieved changed portion to or from the corrected program obtained by correcting the automatically generated program.

According to the first or second embodiment of the present invention, a corrected portion inherited program can be automatically generated by adding or deleting a changed portion to or from a corrected program obtained by correcting an automatically generated program after changing the designing information.

Therefore, since it is not necessary to clearly describe the corrected portion in the program, a corrected portion inherited program can be automatically generated without complicating the program correcting operation.

In addition, since a comment indicating the addition or deletion is added after or before a code added or deleted by a change in designing information, a portion changed in a program by the change in designing information can be easily detected.

Furthermore, when a corrected portion inherited program is generated, the contents of a design change, and the information about the number of a program line into or from which a code has been added or deleted, about the type of the code, etc are output as a log file. Accordingly, the user can be informed when the code was changed, and what type of code was changed.

BRIEF DESCRIPTION OF THE DRAWINGS

FIG. 5 shows an old table CASE_DATA.MDB, and the contents;

FIG. 6 is a form index table of the old designing information;

FIG. 7 is a form listing table of the old designing information;

FIG. 8 is an action table of the old designing information;

FIG. 9 is a group action listing table of the old designing information;

FIG. 10 is an input/output information definition table of the old designing information;

FIG. 11 shows the contents of the action definition table of the old designing information;

FIG. 12 is a form index table of the latest designing information;

FIG. 13 is a form listing table of the latest designing information;

FIG. 14 is an action table of the latest designing information;

FIG. 16 is a group action listing table of the latest designing information;

FIG. 17 shows the contents of the action definition table of the latest designing information;

FIG. 18 is an input/output information definition table of the latest designing information;

FIG. 20 shows the contents of an input/output information definition table of the old designing information;

FIG. 21 shows the contents of an input/output information definition table of the latest designing information;

FIG. 22 shows the overwrite information of the correction information list box;

FIG. 23A shows a form correction information list box;

FIG. 23B shows a group correction information list box;

FIG. 23C shows an action form correction information list box;

FIG. 24 shows an item correction information list box;

FIG. 25 shows the method of retrieving a character string;

FIGS. 26A and 26B show a corrected work BAS (1);

FIGS. 27A and 27B show a corrected work BAS (2);

FIGS. 28A and 28B show a corrected work BAS (3);

FIGS. 29A and 29B show a new work BAS (1);

FIGS. 30A and 30B show a new work BAS (2);

FIGS. 31A and 31B show a new work BAS (3);

FIGS. 32A and 32B show a new work BAS (4);

FIG. 33A shows a d deleted procedure list box;

FIG. 33B shows an added procedure list box;

FIGS. 34A and 34B show a re-mock-up work BAS (1);

FIGS. 35A and 35B show a re-mock-up work BAS (2);

FIGS. 36A and 36B show a re-mock-up work BAS (3);

FIGS. 37A and 37B show a re-mock-up work BAS (4);

FIGS. 38A and 38B show a re-mock-up work BAS (5);

FIGS. 39A and 39B show a re-mock-up log; and

DESCRIPTION OF THE PREFERRED EMBODIMENTS

The automatic program generation apparatus and the method of automatically generating a program which inherits the contents of the corrections to a corrected program obtained by correcting an automatically generated program according to the present invention are described below by referring to the attached drawings.

Figure 1:
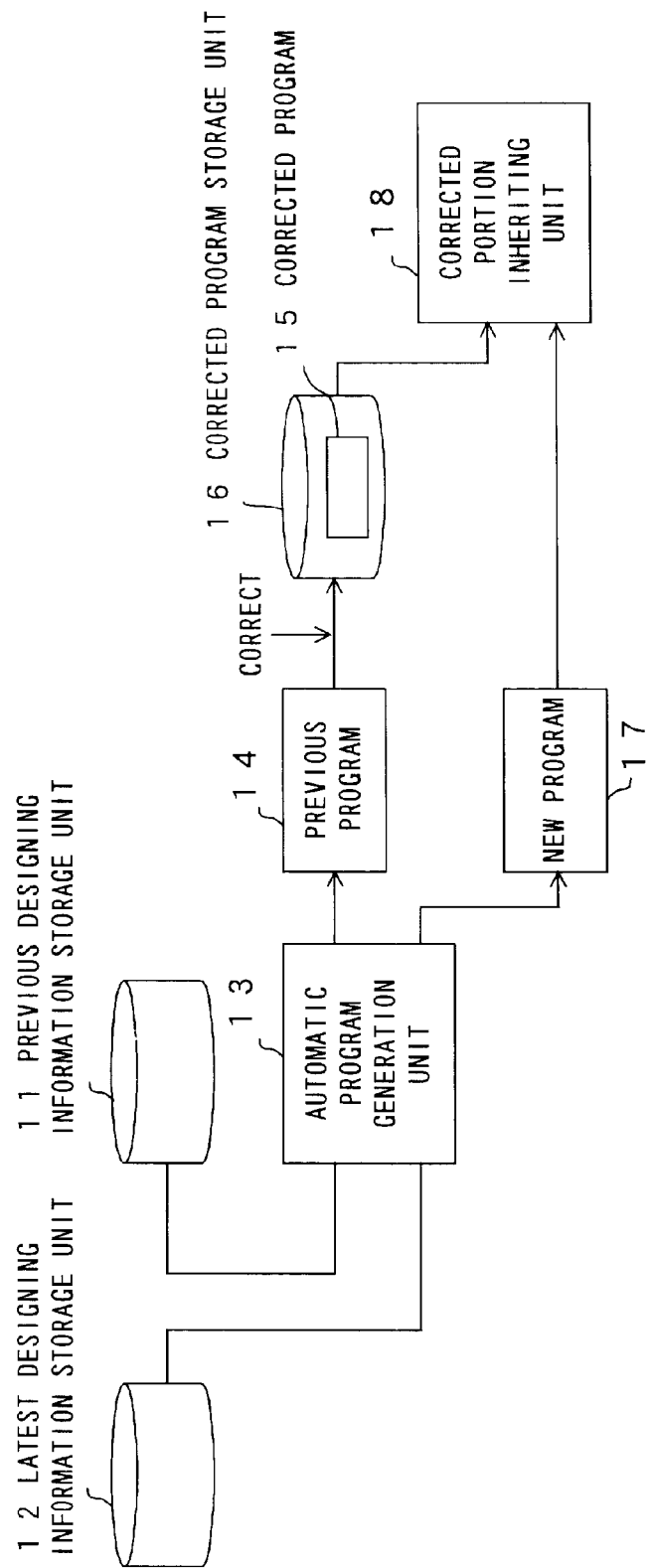
FIG. 1 is a block diagram of the automatic program generation apparatus.
Figure 2:
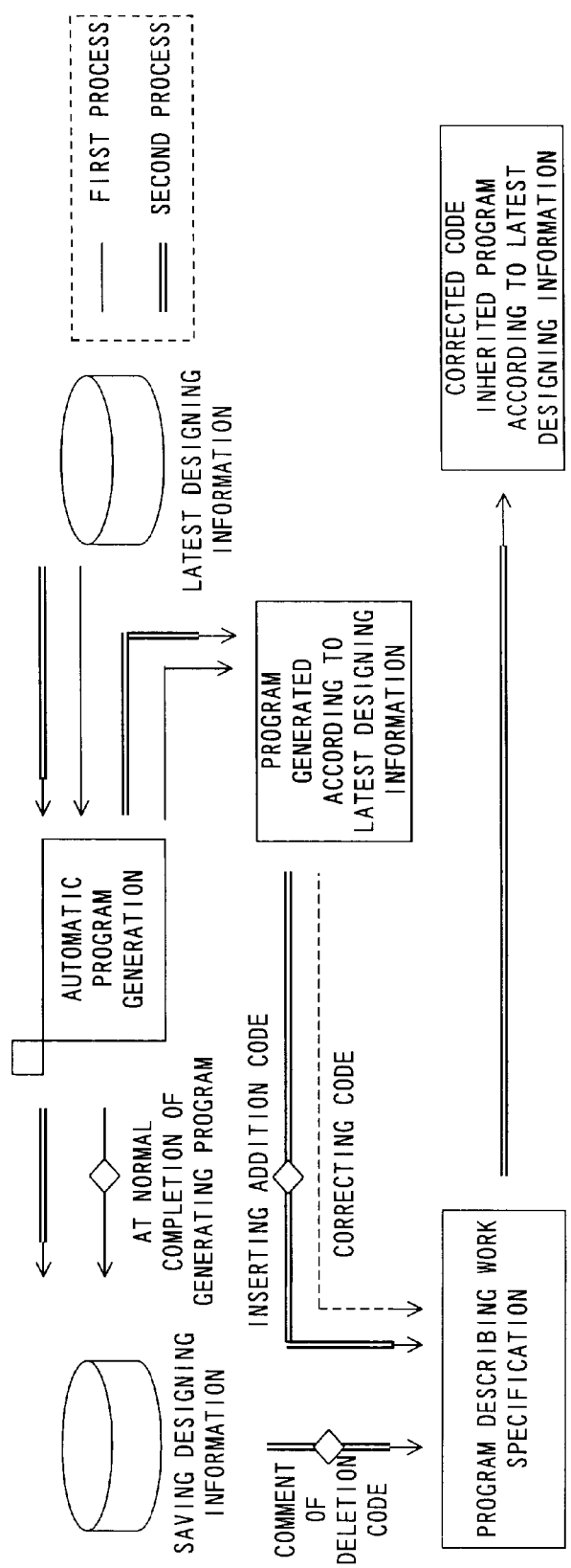
FIG. 2 shows the process of generating a program.

FIG. 1 is a block diagram of the automatic program generation apparatus according to an embodiment of the present invention. FIG. 2 shows the process of generating a program.

In FIG. 1, a previous designing information storage unit 11 is a storage unit for saving designing information used in automatically generating a previous program, and saves the designing information used each time a program is automatically generated.

A latest designing information storage unit 12 stores the latest designing information, and stores the latest changed designing information if the designing information has been changed after a program is automatically generated.

An automatic program generation unit 13 automatically generates a program according to designing information. If a correction is made to an a generated a program according to designing information. If correction is made to a automatically generated previous program 14, then a corrected program 15 is stored in a corrected program storage unit 16.

When a code is added after designing information has been changed, a corrected portion inheriting unit 18 retrieves an added portion using a new automatically generated program 17. When a code is deleted after designing information has been changed, the corrected portion inheriting unit 18 retrieves a deleted portion using the corrected program 15. Then, the added portion obtained by the retrieval is added to the corrected program 15, and the deleted portion is deleted from the corrected program 15.

Thus, since a code is added or deleted to the corrected program 15 as a result of a change made to designing information, a corrected portion inherited program can be automatically generated.

In addition, a corrected portion inherited program can be automatically generated according to designing information by the automatic program generation unit 13 and the corrected portion inheriting unit 18.

FIG. 2 shows the process of generating a program. When a program is automatically generated in the first automatic generation process, the designing information used in the process is saved. Then, the program generated in the first automatic generation process is corrected according to an actual work specification.

Next, when the designing information is changed, a new program is automatically generated according to the latest changed designing information. Then, according to the difference between the saved first designing information and the latest second designing information, a code to be deleted and a code to be added after the change of the designing information are retrieved from the program, and the codes are added to or deleted from a corrected program which is corrected according to a work specification, thereby generating a corrected portion inherited program.

The contents of the process performed when a corrected program inherited program is automatically generated according to designing information in the automatic program generation apparatus with the above described configuration (this can be referred to as a mock-up) are described below by referring to the flowcharts shown in FIGS. 3 and 4.

Figure 3:
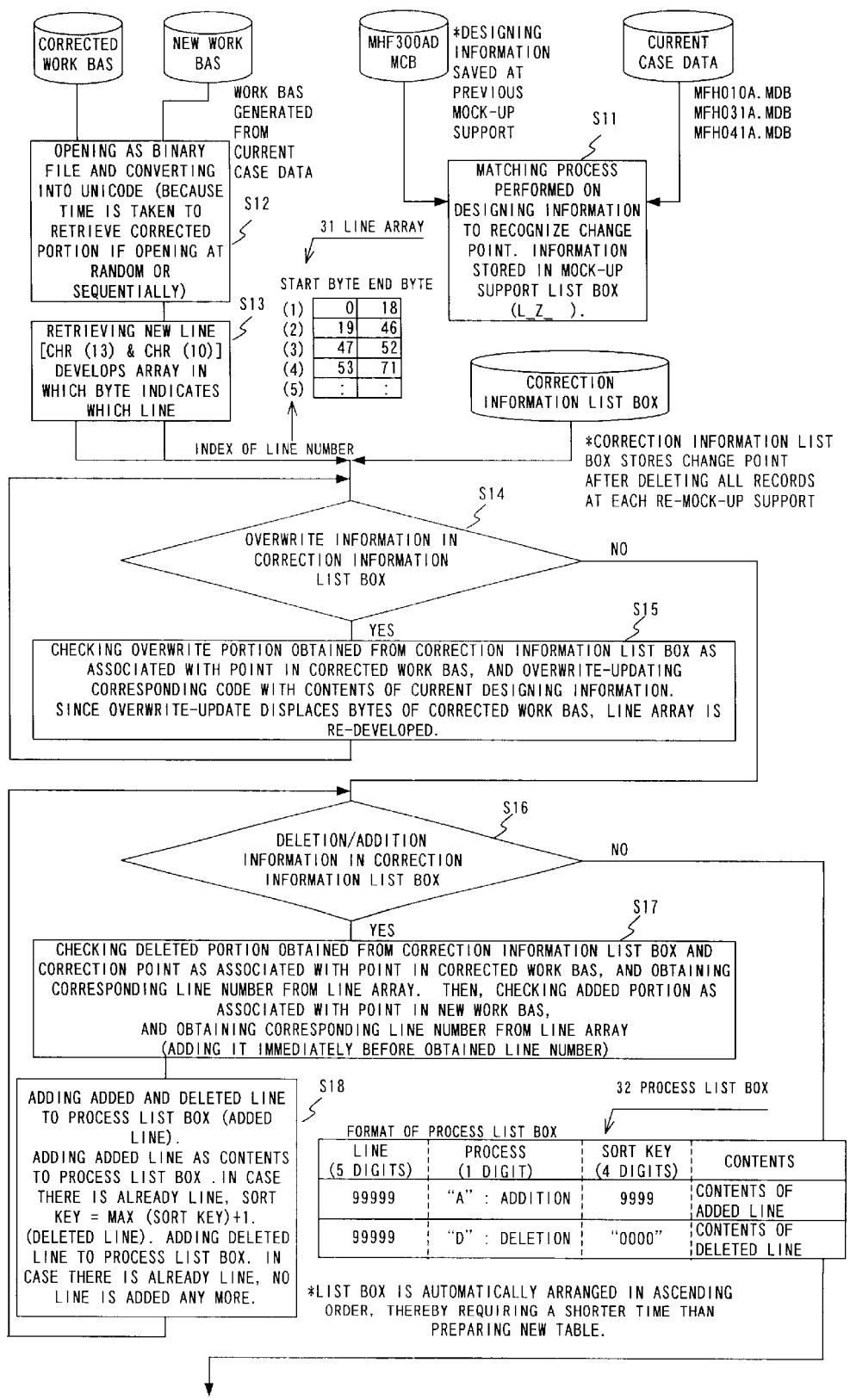
FIG. 3 is a flowchart (1) of the process of automatically inheriting a corrected program.

The current changed designing information (current CASE data) is compared with the designing information (MFH300AD.MDB) saved in the previous mockup process, a changed point is extracted, and the information indicating the changed point is stored in the correction information list box (S11 in FIG. 3). The correction information list box stores changed points after deleting all records at the re-mock-up support, that is, when a program is automatically generated.

The correction information list box stores, for example, a form ID, a group ID, an action ID, etc. which are described later and are to be updated, added, or deleted by a change of an item of designing information such as a form, a group, an action, etc.

When a previously and automatically generated program is corrected according to a work specification, the corrected program is stored as a corrected work BAS (corrected work program). In addition, a program generated according to the current CASE data is stored as a new work BAS (new work program).

Then, the corrected work BAS and the new work BAS are opened as binary files, and converted into unicodes which are character codes (S12). Furthermore, a new line code is retrieved from the program so that a line array 31 can be developed such that a line can be specified by a bit number (S13). The line array 31 is stored in a way that lines are stored in order from line 1 with each starting byte number and ending byte number as shown in FIG. 3. Therefore, if a code can be specified by the byte number from the start of the program, the line number can be obtained from the line array 31.

Next, it is determined whether or not overwrite information is stored in the correction information list box (S14). If the correction information list box stores overwrite information (YES in S14), the overwrite point in the corrected work BAS is detected according to the information about the overwrite point in the correction information list box, and the corresponding code is updated by overwriting the contents of the current designing information. Furthermore, when the overwriting update changes the byte number of the corresponding line of the corrected work BAS, the byte number of the line array 31 is corrected, and the line array 31 is redeveloped (S15).

When the overwrite of the corrected work BAS according to a piece of overwrite information in the correction information list box is completed, control is returned to step S14, and the above described processes are repeated.

On the other hand, when there is no overwrite information in the correction information list box, or when the overwrite information in the correction information list box is completed updated and no more unprocessed overwrite information remains in the correction information list box (NO in S14), control is passed to step S16, and it is determined whether or not the correction information list box stores deletion/addition information.

If the correction information list box stores deletion/addition information (YES in S16), then the deleted portion in the corrected work BAS is located according to the correction information and a correction point in the correction information list box. Then, the corresponding line number is obtained from the line array 31. In addition, an added portion in the new work BAS is located according to the addition information in the correction information list box, and the corresponding line number in the corrected work BAS is obtained from the line array 31.

A correction point indicates which procedure is added, deleted, or corrected based on a design change item. For example, in a work item test program described in the Visual Basic described later, a file opening process, a form allotting process, etc. are changed when a form is added or deleted, and a file opening process, a form allotting process, a button process allotting, etc. are changed when a group is added.

In addition, when an adding process is performed, the line number of the corrected work BAS is obtained, for example, by determining whether or not the name of the procedure added to the new work BAS as a result of a change in designing information can also be detected in the corrected work BAS. If the name cannot be detected, then a code matching the code immediately before the leading line of the procedure added to the new work BAS is retrieved from the corrected work BAS. If the name exists in the corrected work BAS, then the ordinary byte number of the next line from the start of the program is obtained, and the line number can be obtained from the obtained byte number, and the starting and ending byte numbers of the line array 31 of the corrected work BAS. In addition, an added portion is added immediately before the obtained line number.

Next, a line number of a line added to or deleted from the corrected work BAS, the type of the addition or deletion, a Sort key indicating a serial number of a plurality of lines to be added or deleted, and the contents of the added or deleted line are written to a process list box 32 (S18). When the contents of a change are added, the line number to be added is written to the 'line' column, and 'A' indicating 'addition' is written to the 'type' column in the process list box 32. When the added line has already existed, a value obtained by adding 1 to the maximum value of the Sort key is written to the Sort key column, and a code to be added, comment, etc. are written to the 'contents of a correction' column. If the contents of a correction is deleted, the line number of the deleted line, 'D' indicating that the correction refers to deletion, the Sort key, and the contents of the deleted line are written to the process list box 32.

Since data is automatically rearranged in an ascending order, that is, in order of line number in the process list box 32, it is not necessary to rearrange data when a line is added or deleted, thereby obtaining necessary data at a higher speed than using a table.

When a corrected portion is added to the process list box 32 according to a piece of correction information in the correction information list box, control is returned to step S16, and the above described process is repeated.

Figure 4:
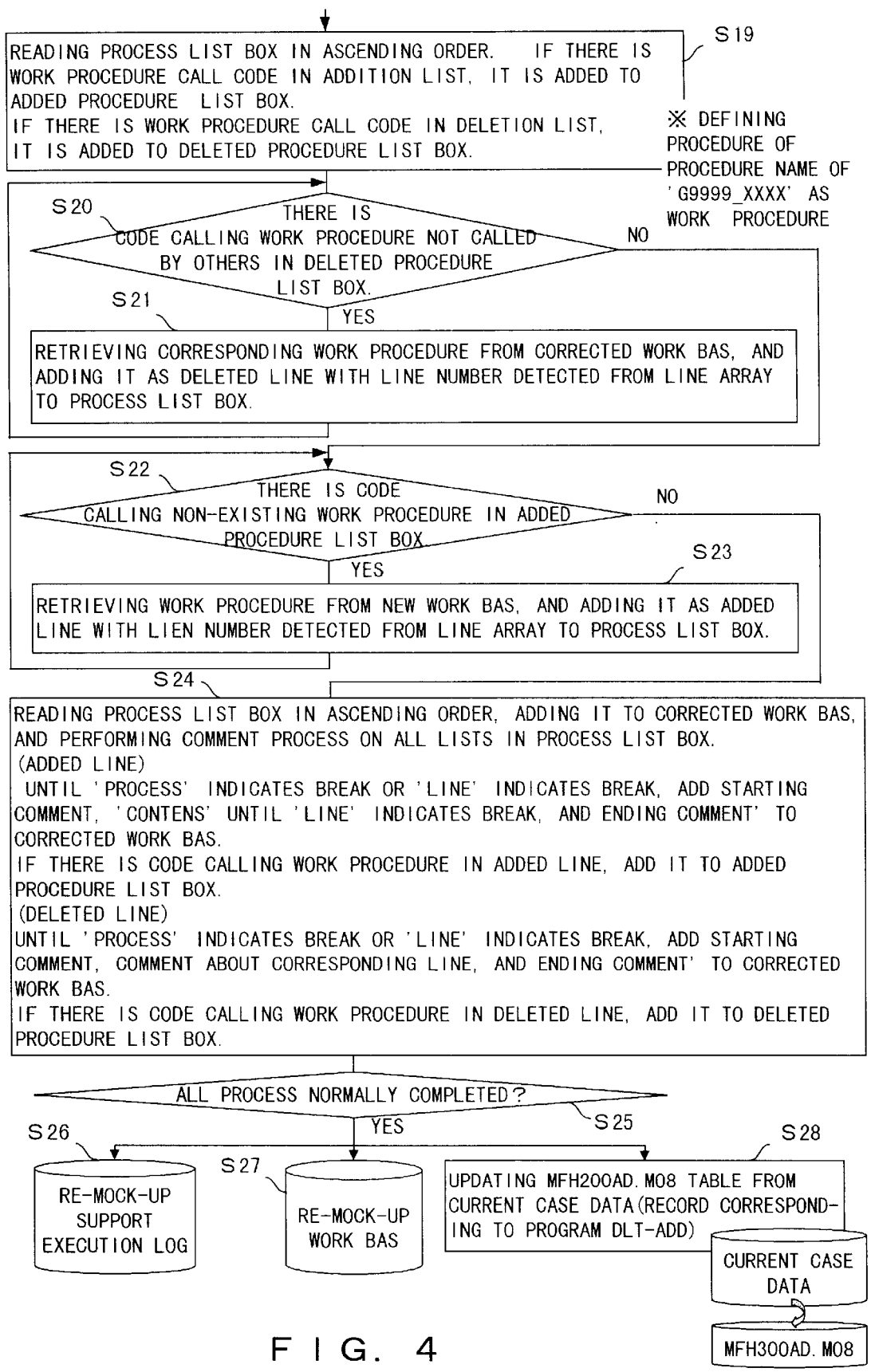
FIG. 4 is a flowchart (2) of the process of automatically inheriting a corrected program.

If no unprocessed correction information is detected in the process list box 32, control is passed to step S19 shown in FIG. 4, and the following process is performed.

The data in the process list box 32 is read in the ascending order, and it is determined whether or not there is a work procedure call code in the codes added to the process list box 32. If there is a work procedure call code, the call code is added to the added procedure list box. If there is a work procedure call code in the codes to be deleted in the process list box 32, then the call code is added to the deleted procedure list box.

Next, it is determined whether or not there is a work procedure call code not called by another code in the deleted procedure list box (S20). If there is a corresponding code, then the work procedure is retrieved from the corrected work BAS, the line number in the corrected work BAS of the corresponding work procedure is retrieved from the line array 31, the obtained line number is set in the process list box 32 as the line number of the line to be deleted, and control is returned to step S20 (S21).

That is, if the work procedure entered in the deleted procedure list box is called only by the call code to be deleted, but is not called by any other portion in the corrected work BAS, then the line in the corrected work BAS is set in the process list box 32 as a line to be deleted because deleting the work procedure does not affect the operations of the corrected work BAS.

If there is no work procedure call code which is not called by any other portion in the determination in step S20 (NO in S20), that is, if all work procedure codes, line numbers, etc. which are not called by any other portions in the corrected work BAS are set in the process list box 32 as lines to be deleted, or if there is no procedure to be deleted in the deleted procedure list box, then control is passed to step S22, and it is determined whether or not there is a code calling a work procedure not existing in the corrected work BAS.

If a code calling a work procedure not existing in the corrected work BAS is entered in the added procedure list box (YES in S22), then a corresponding work procedure is retrieved from a new work BAS, the line number indicating the position at which the work procedure is added in the corrected work BAS is obtained from the line array 31, and the obtained line number and the code is added to the process list box 32 as lines to be added (S23).

That is, if a code calling a work procedure not existing in the corrected work BAS is entered in the added procedure list box, then it is a case in which a work procedure is added by a change in designing information. Therefore, the work procedure is retrieved from the new work BAS, the line number in the corrected work BAS for addition of the work procedure is obtained from the line array 31, and the obtained line number is set in the process list box 32. Furthermore, a code of the work procedure to be added is obtained from the new work BAS, and the code is set in the process list box 32 as the contents of the addition. Thus, the code and the line number of the work procedure to be added by a change in designing information are set in the process list box 32.

If the added procedure list box does not contain a code which calls a work procedure not existing in the corrected work BAS (NO in S22), that is, if the line numbers, and codes of all work procedures which are set in the added procedure list box but do not exist in the corrected work BAS have been added to the process list box 32, or if a work procedure to be added to the added procedure list box has not been entered, then control is passed to step S24, and the following processes are performed.

The data in the process list box 32 are sequentially read, and all codes in the process list box 32 are added to the corrected work BAS or modified with comments (nullifying codes).

For example, if a line is to be added, and a process is changed to 'adding' from another (break), then a starting comment indicating the start of an added line is added as a header of the added portion of the corrected work BAS, and then a code of the process list box 32 is added. When the process is changed or the line numbers are not serial numbers (break), an ending comment indicating the end of the added portion is added. I a line is to be deleted, and a process is changed to 'deleting' from another, then a starting comment and an ending comment are added respectively a starting and ending positions of the deleted portion of the corrected work BAS, and then the code of the line to be deleted is nullified. If there is a work procedure call code in a line to be added or deleted, then the work procedure is added to the adding or deleted procedure list box, a process relating to the added procedure list box or the deleted procedure list box is performed, and the code of the corresponding procedure is set in the process list box 32.

It is determined whether or not the above described processes have been normally completed (S25). If yes, the corrected portion of the corrected work BAS corrected according to the work specification is inherited, and an execution log including a line number, the contents of a change, a generation date, etc. of an added line and a deleted line of a program (re-mock-up work BAS) generated after a change in designing information is generated (S26). In addition, a re-mock-up work BAS is stored in the storage unit (S27). Furthermore, the latest designing information (CASE data) is saved in the MFH300AD.MDB to automatically generate the next program (S28).

Described next is the case in which a program is automatically generated in the above described program automatic generation apparatus according to changed designing information by inheriting the contents of a correction made to the program 'work item test' described in Visual Basic.

In the following example, the group ID '4' is added to the form of 'AATEST06', a deletion key (ESC) is assigned to an F11 key, an input completion key (ENT) is assigned to an F12 key, and the item 'course name' is deleted.

FIG. 5 shows the table of 'old CASE_DATA.MDB' saved as old designing information and the contents of the table. FIGS. 6 through 11 shows the contents of the table of the old designing information. FIGS. 12 through 18 shows the contents of the table of the latest designing information.

As shown in FIG. 5, the old designing information comprises a PROJECT table (T_PROJECT), a group ID master table (T_group ID master), an action table (T_action), a form listing table (T_form listing), a form index table (T_form index), a program listing table (T_program listing), an input/output information definition table (T_input/output information definition), a group action listing table (T_group action listing), and an action definition table (T_action definition). The latest designing information also comprises similar tables.

The group ID master table stores a group ID and a group constant (group name). According to this table, a group name corresponding to a group ID can be obtained.

A form index table 61 of the old designing information shown in FIG. 6 stores a program ID and a form index. According to the form index table 61, for example, a form 'AATEST06' is set in the program ID 'AATESTVE', and indicates that it is a start-up form.

A form listing table 71 of the old designing information shown in FIG. 7 stores a program ID, a form ID, and a form index (serial number). According to the form listing table 71, the form index of the form of the form ID 'AATEST06' is 85.

An action table 81 of the old designing information stores a program ID, a form index, and a group ID as shown in FIG. 8. According to this action table 81, for example, the group IDs '1' and '5' are set in the form of the form index 85 of the program ID 'AATESTVE'.

A group action listing table 91 of the old designing information shown in FIG. 9 stores a program ID, a form index, a group ID, an action ID, an action type, and action information 1 and 2. According to the group action listing table 91, the action IDs 'ENT' and 'FIN' are set in the group of the group ID '1' of the form index 85, and the action IDs 'ESC', 'NXT', 'BFR', and 'ENT' are set in the group of the group ID '5'.

An input/output information definition table 101 of the old designing information shown in FIG. 10 stores a program ID, a form ID, a SORT number, an item ID, a level, an item name, a group ID, etc. According to the input/output information definition table 101, nine items from the 'customer code' to the 'enter 05' are set in the form of the form ID 'AATEST06'.

An action definition table 111 of the old designing information shown in FIG. 11 shows which action is defined by which key. 'FIN' (end) and 'ENT' (completion of entry) are defined as actions of the key of the header in the group of the group ID '1'. 'BFR' (previous page), 'NXT' (next page), 'ESC' (deletion), and 'ENT' (completion of entry) are defined as the actions of the key of the body in the group of the group ID '5'.

Next, FIGS. 12 through 18 show the contents of the table of the latest designing information. A form index table 121 of the latest designing information shown in FIG. 12 has the configuration similar to that of the form index table 61. In this example, the form of the program ID 'AATESTVE' is only 'AATEST06', and there is no increase or decrease in form.

A form listing table 131 of the latest designing information shown in FIG. 13 basically has the configuration similar to that of the form listing table 71 shown in FIG. 7. In FIG. 7, the program ID is shown. However, in FIG. 13, the program ID is omitted, and a form name is added. These drawings show a part of a table. In this example, since there is no increase or decrease in form, the form index remains unchanged as 85.

An action table 141 of the latest designing information shown in FIG. 14 stores a form index and a group ID. In this example, since the group ID '4' is added to the form ID 'AATEST06', the group ID '4' is added to the form index 85 of the action table 141 of the latest designing information.

In addition, correction information is set in the correction information list box described later according to the information of each table of the latest designing information and the old designing information. For example, when a group is added to a specific form, correction information relating to a group is set in the correction information list box (L_Z_group) of the group.

Figure 15:
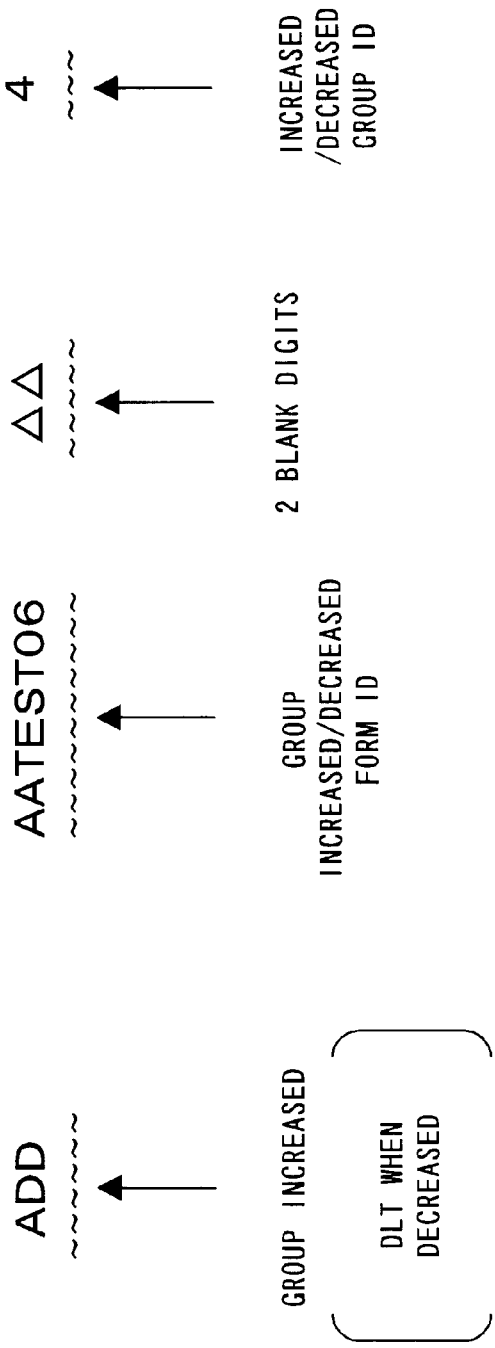
FIG. 15 shows the contents of the correction information list box of a group.

In this example, according to the action tables 81 and 141 shown in FIGS. 8 and 14, the group ID '4' is added to the form ID 'AATEST06'. Therefore, 'ADD' is set as the information indicating the adding or deleting of a group process, 'AATEST06' is set as the form ID of the group, and 4 is set as the group ID to be added in the correction information list box of the group as shown in FIG. 15.

FIG. 16 shows a group action listing table 161 of the latest designing information. FIG. 17 shows the contents of a action definition table 171 of the latest designing information.

In this example, 'ESC' (deletion) and 'ENT' (completion of entry) are set as action IDs of the F11 and F12 keys of the group of the group ID '4'.

In the group action listing table 161 shown in FIG. 16, when a group is added, an action is also added. Therefore, it is not checked whether or not the number of actions has been increased or decreased. However, it is checked whether the number of action IDs has been increased or decreased on the groups having the existing group IDs '1' and '5'. In this case, since the action ID is not changed in the groups having the group IDs '1' and '5', no correction information about an action is set in the action correction information (L_Z_action) described later.

Figure 19:
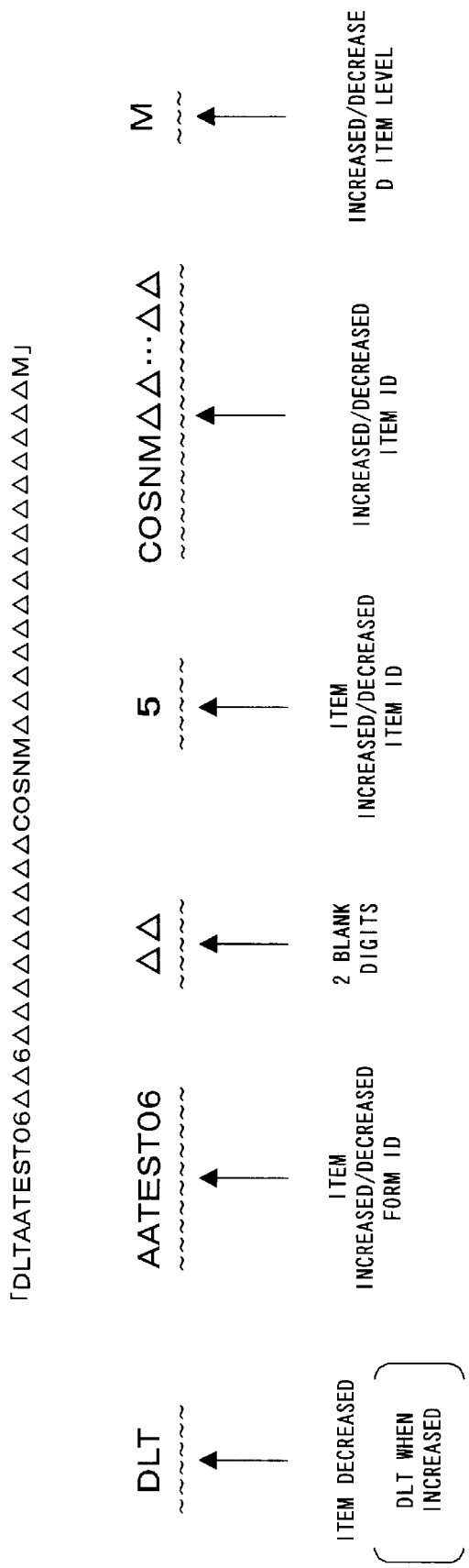
FIG. 19 shows the contents of the item correction information list box.

FIG. 18 shows a part of an input/output information definition table 181 of the latest designing information. In this example, according to the two input/output information definition tables 101 and 181 shown in FIGS. 10 and 18, an 'enter 04 point' is added as an item of the group ID '4', and the 'course name' of the item ID 'COSNM' is deleted. Accordingly, the contents shown in FIG. 19 are set in the correction information list box of the item described later.

In this case, the 'course name' has been set as an item of the group of the group ID '5' in the input/output information definition table 101 of the old designing information. However, since the 'course name' has been deleted in the input/output information definition table 181 of the latest designing information, 'DLT' is set as a process of addition or deletion, 'AATEST06' is set as the form ID whose item has been deleted, 5 is set as the group ID whose item has been deleted, 'COSNM' is set as a deleted item ID, and M is set as the level of the deleted item in the process information list box of the item described later as shown in FIG. 19.

The level M indicates whether or not the detailed transaction file is to be added.

FIGS. 20 and 21 show the contents of the above described input/output information definition table 101 of the old designing information and the input/output information definition table 181 of the latest designing information.

The name of an item, the type of an item indicating text, command button, etc., the attribute indicating the contents of an item, for example, date/time, Japanese language, numeric, etc., the number of digits, etc. are set in the input/output information definition tables 101 and 181.

When the two input/output information definition tables 101 and 181 shown in FIGS. 20 and 21 are compared with each other, the item 'enter 04 point' of the group ID '4' is added, and the 'course name' of the group ID '5' is deleted in FIG. 21.

Described below is the configuration of the correction information list box generated according to the above described tables.

FIG. 22 shows the overwrite information about an overwrite correction information list box (L_Z_RW) 221. When a system name (SYSNAME), a program name, a group contest (group name), etc. are changed, the name before a change and the name after the change are stored in the overwrite correction information list box 221. When a re-mock-up process is performed, the system name, the program name, etc. are overwritten according to the overwrite information.

Next, FIG. 23A shows a form correction information list box 231, FIG. 23B shows a group correction information list box 232, FIG. 23C shows an action correction information list box 233, and FIG. 24 shows an item correction information list box 241.

A form correction information list box (L_Z_form) 231 shown in FIG. 23A stores the information about the contents of a correction, that is, the process of addition (ADD), deletion (DLT), or update (UPD), a new form ID added or deleted, a new form ID together with an old form ID and a new group ID together with an old group ID when an update process is performed. Then, it is determined whether the contents of a change of the designing information refers to addition, deletion, or update according to the above described old designing information table and the latest designing information table, that is, according to the difference between the old designing information and the latest designing information. Then, the process indicating the contents of the change is set. Furthermore, the form ID to be added or deleted is set as a new form ID. In the case of an update process, a form ID to be updated, an old form ID, a new group ID, and an old group ID are set.

Similarly, the information indicating a process of addition or deletion, the form ID to which an added or deleted group belongs, an added or deleted group ID, and the information indicating whether a detailed transaction file has been added, has not been added, has been decreased, or has not been decreased are set in the group correction information list box (L_Z_group) 232 of the group shown in FIG. 23B. The information about the detailed transaction is set to M as the information indicating the increase/decrease of the detailed transaction file when the detailed transaction file increases or decreases by the addition or deletion of a group, and is set to '' as the information indicating that the detailed transaction file does not increase or decrease by the addition or deletion of a group.

It is determined whether or not a group is added or deleted regardless of the increase or decrease of a form according to the old designing information and the latest designing information. Only the information about a group added or deleted regardless of the increase or decrease of a form is set in the group correction information list box 232.

Similarly, the information indicating a process of addition or deletion, the form ID and the group ID to which an added or deleted group belongs, an added or deleted group ID, and the added or deleted action ID are set in the action correction information list box 233 shown in FIG. 23C. According to the old designing information and the latest designing information, it is determined whether or not an action increases or decreases, or whether or not action information has been changed regardless of the addition or deletion of a form or a group. Only the information relating to an action added or deleted regardless of a form or a group is set in the action correction information list box 233.

The information indicating the process of addition or deletion, an added or deleted item ID, the form ID and group ID to which the item belongs, and a level are set in the item correction information list box (L_Z_item) 241. Then, it is determined according to the old designing information and the latest designing information whether or not an item is added or deleted regardless of the addition or deletion of a form or a group. Only the information about the item added or deleted regardless of a form or a group is set in the item correction information list box 241. If all of the form ID, group ID, item ID, level, type, attribute do not match, it is determined that an item has been added or deleted.

Next, for example, automatically generating a corrected portion inherited program obtained by correcting an automatically generated program based on a work specification is described below using a 'work item testing' program. In the descriptions below, using the related portions in the three programs of: a program obtained by correcting an automatically generated program based on a work specification (corrected work BAS); a program automatically generated according to the latest designing information (new work BAS); and a program automatically generated by inheriting the contents of a correction of a program (re-mock-up work BAS), the method of automatically generating a corrected portion inherited program by retrieving a code deleted or added as a result of a change in designing information is described.

First, according to the correction information about the above described correction information list box, the method of retrieving a code added or deleted according to the latest designing information is described.

FIG. 25 shows the method of retrieving a character string when the design of a form, group, action, or item is changed.

When a form is changed, a character string 'Case {form number}' containing the form ID of the form which is set in the form correction information list box 231 and is to be design-changed is retrieved from a program. If the character string including the form number has been detected, then the detected line and all codes in the 'Case' are extracted as changed codes.

In addition, the character string 'DFNUM {file number}' containing the file number of the form to be design-changed is retrieved. If the line containing the file number is detected, then the line and the subsequent three lines are extracted as changed lines. Furthermore, the character string 'Close#DFNUM {file number} is retrieved, and a corresponding line is extracted as a changed code.

When a group is changed, the character string 'Case F_{fgroup name}' containing the group name corresponding to the group ID of the group which is set in the group correction information list box 232 and is to be design-changed is retrieved from the program. If a character string containing the group name is detected, then the detected line and all codes in the 'Case' are extracted as changed codes (condition (1) shown in FIG. 25).

Then, the character string 'DFNUM {file number} containing the file number of the group to be design-changed is retrieved. If the line containing the file number is detected, the line and the three subsequent lines are extracted as changed codes (condition (2) shown in FIG. 25). Furthermore, the character string 'Close#DFNUM {file number}' is retrieved, and the corresponding line is extracted as a changed code (condition (3) shown in FIG. 25).

When an action is changed, the character string 'Case A_{action name}' containing the action name corresponding to the action ID which is set in the action correction information list box 233 and is to be design-changed is retrieved from the program. If the character string containing the action name is retrieved, then the retrieved line and all codes in the 'Case' statement are extracted as changed codes.

When an item is changed, the character string '{form ID}_{transaction type}.{item ID}' containing the item ID of the item which is set in the item correction information list box 241 and is to be design-changed and the form ID to which the item belongs is retrieved. If the character string containing the item ID is retrieved, then the line is extracted as a changed code (condition of (4) shown in FIG. 25). In addition, the character string '{specification type} {form ID} {item ID}' is retrieved, and the corresponding line is extracted as a changed line (condition of (5) shown in FIG. 25). Items are contained in all procedures.

Described below is the case in which, in a 'work item test' program, an added portion and a deleted portion are retrieved when the group ID '4' is added to the form of the form ID 'AATEST06' by the change in designing information, and the item 'course name' is deleted.

When a design change refers to deletion of an item, a corresponding character string is retrieved from the corrected work BAS according to the conditions (4) and (5) of the retrieved character string relating to the item shown in FIG. 25.

FIGS. 26A through 28B show a part of the program of the corrected work BAS. In this example, since an item is deleted by the change in designing information, the information that the process is deletion, the form ID of the item to be deleted is 'AATEST06', and the item ID to be deleted is 'COSNM' is set according to the difference between the old designing information and the latest designing information in the item correction information list box 241 as shown in FIG. 19. Therefore, according to the information, based on the condition of (4) shown in FIG. 2, 'AATEST06 {form ID}_M {transaction type}.COSNM {item ID} is defined. Based on the condition of (5) shown in FIG. 25, 'M {specification type}06 {form number} COSNM {item ID} is defined. Then, the character string is retrieved from the corrected work BAS. A form number is represented by the two lower digits of the form ID.

As a result, it is detected that the retrieved character string 'AATEST06 M COSNM' is contained in 'line 291' and 'line 302' of the corrected work BAS as shown in FIG. 26A. Since this satisfies the condition of (4) shown in FIG. 25, these lines are extracted as deleted portions of the corrected work BAS.

Similarly, since 'line 486' and 'line 487' shown in FIG. 27A satisfy the condition of (4) of the retrieved character string shown in FIG. 25, the lines are extracted as deleted portions of the corrected work BAS.

Furthermore, it is detected that 'line 557' and 'line 564' shown in FIG. 28A contain the retrieved character string 'M06COSNM'. Since this satisfies the condition of (5) shown in FIG. 25, the lines are extracted as the deleted portions of the corrected work BAS.

If a change in design refers to adding a group, then a corresponding character string is retrieved from the new work BAS according to the rules of the retrieved character string shown in FIG. 25.

FIGS. 29A through 32B show a part of the program of the new work BAS. In this example, since the group ID '4' is added by the change in designing information, the information that the process is addition, the form ID of the group to be added is 'AATEST06', and the group ID is '04' is set in the group correction information list box 232 as shown in FIG. 15. Therefore, according to the information, 'Case F_BODY_CARD {group name}' of (1) shown in FIG. 25, 'DFNUM {file number}' of (2) shown in FIG. 25, and 'Close #FUNUM {file number}' of (3) shown in FIG. 25 are defined as retrieved character strings. Then, the character strings are retrieved from the new work BAS. The group name is obtained from the group ID master table based on the group ID.

First, the generation date of the new work BAS is added as shown in FIG. 29A. Next, since the code added by 'DFNUM {file number}' does not exist in the file opening process in line 41 through 55, the code corresponding to (2) shown in FIG. 25 does not exist.

When the retrieved character string 'Case F_BODY_CARD' is detected in line 68 of the program shown in FIG. 29B, this satisfies (1) shown in FIG. 25. Accordingly, all codes in the 'Case' statement, that is, the codes in lines 68 and 69 are extracted as added codes. Then, the added codes are set in the process list box 32. Since a procedure 'G1106_GRP4' not existing in the corrected work BAS is called in this 'case' statement, the procedure 'G1106_GRP4' described in lines 101 through 124 shown in FIG. 30A is entered in an added procedure list box 331.

Furthermore, a procedure 'G4006_GRP4_CHK' (code in lines 245 through 261 shown in FIG. 31B) called in the procedure 'G1106_GRP4' is also entered in the added procedure list box 331.

In addition, a procedure 'G5306_BODY_M_CREATE' and a procedure 'G9106_DSPDATA_BODY_M' called in the procedure 'G1106_GRP4' are entered in the added procedure list box 331. Since these two procedures exist in the corrected work BAS, the codes of these procedures are finally not set in the process list box 32, and no procedures are added.

A procedure 'G4006_GRP4_CHK1' (code in lines 262 through 266 shown in FIG. 31B) called in the procedure 'G4006_GRP4_CHK' shown in FIG. 31B is also entered in the added procedure list box 331.

Since the retrieved character string 'Close # . . . ' of (3) shown in FIG. 25 does not exist in the CLOSE process in lines 553 through 561 shown in FIG. 32A, there are no added codes.

As a result, there are the procedures 'G1106_GRP', 'G4006_GRP4_CHK', 'G5306_BODY_M_CREATE', 'G9106_DSPDATA_BODY_M', and 'G4006_GRP4_CHK1' entered in the added procedure list box 331 as shown in FIG. 33B.

In this example, since a procedure is not called in a deletion code detected from the corrected work BAS, no deleted procedures are entered in a deleted procedure list box 332 shown in FIG. 33A.

As described above, if a procedure which is retrieved from the new work BAS and is to be added is entered in the added procedure list box 331, then the procedure entered in the added procedure list box 331 is retrieved from the corrected work BAS. If the procedure does not exist in the corrected work BAS, then the code of the procedure is set in the process list box 32, and the line number in the corrected work BAS to which the procedure is added is obtained from the line array 31. The method of obtaining the line number can be, for example, retrieving from the corrected work BAS a code matching the code in the line immediately before the procedure to be added, and obtaining the line number in the line immediately after the line from the line array 31 of the corrected work BAS if a code-matching line exists. Then, when the line number of the procedure to be added is obtained, it is set in the process list box 32.

If there is a procedure entered in the added procedure list box 331 in the corrected work BAS, then it is not necessary to add the procedure. Therefore, the code of the procedure is not set in the process list box 32.

If it is determined on each of the procedures entered in the added procedure list box 331 whether or not each procedure is to be added to the corrected work BAS, then a code which is detected from the corrected work BAS and is to be deleted and its line number, and a code which is detected from the new work BAS and is to be added to the corrected work BAS and the line number of the code in the corrected work BAS are set in the process list box 32.

FIGS. 34A through 39B show the re-mock-up work BAS automatically generated by changing the corrected work BAS based on a change in designing information. When a re-mock-up process is performed, the date and time of the re-mock-up process is added as shown in lines 12 through 14 shown in FIG. 34A.

Since the group ID '4' is added in this example, 'Case F_BODY_CARD' and 'Call G1106_GRP4' are added from the added code of the process list box 32. Then, 'ADD START' is added as a comment line in the starting line, and 'ADD END' is added in the ending line so that the information that the code has been added can be clearly expressed (lines 69 through 72 shown in FIG. 34B).

Next, according to the addition information in the process list box 32, a code of the procedure 'G1106_GRP4' is added, and 'ADD START' and 'ADD END' are respectively described in the starting and ending lines so that the information that the code has been added can be clearly expressed (line 104 through 129 shown in FIG. 35A).

Then, according to the addition information in the process list box 32, the codes of the procedure 'G4006_GRP4_CHK' and procedure 'G4006_GRP4_CHK1' are added (line 253 shown in FIG. 36B through line 276 shown in FIG. 37A).

Next, since the item 'course name' has been deleted, 'AATEST06_M.COSNM . . . ' is deleted according to the deletion information of the process list box 32. 'DLT START' and 'DLT END' are respectively described in the starting and ending lines so that the information that the code has been deleted by the change in designing information can be clearly expressed (lines 348 through 350, and 361 through 363 in FIG. 37B).

Similarly, according to the deletion information of the process list box 32, the code relating to 'course name' shown in FIG. 38A is deleted (lines 547 through 550 shown in FIG. 38A).

As described above, a corrected contents inherited program (re-mock-up work BA) obtained by correcting the corrected work BAS according to the work specification can be automatically generated.

According to the present embodiment, a program can be automatically generated with the corrected portion inherited according to changed designing information without adding a comment such that the corrected portion of a program corrected according to the work specification can be identified. In addition, from the difference between the old designing information and the latest designing information, the added portion and deleted portion in the program corrected according to the work specification can be detected. Therefore, a comment line can be automatically input such that the added or deleted portion can be detected when a program is automatically generated, thereby easily detecting a corrected portion in a program.

Furthermore, when a corrected portion in a corrected program is to be inherited in the conventional method, a program for automatically generating a program according to designing information, and a program for extracting the corrected portion in a program and protecting the corrected portion at the automatic generation of the program are required. Thus, when a change in specification occurs in a program for automatically generating a program, these programs are to be completely change. On the other hand, according to the present invention, even if the specification of a program for automatically generating a program has been changed, only the program for automatically generating a program has to be changed, thereby easily changing the program.

Figure 39B:
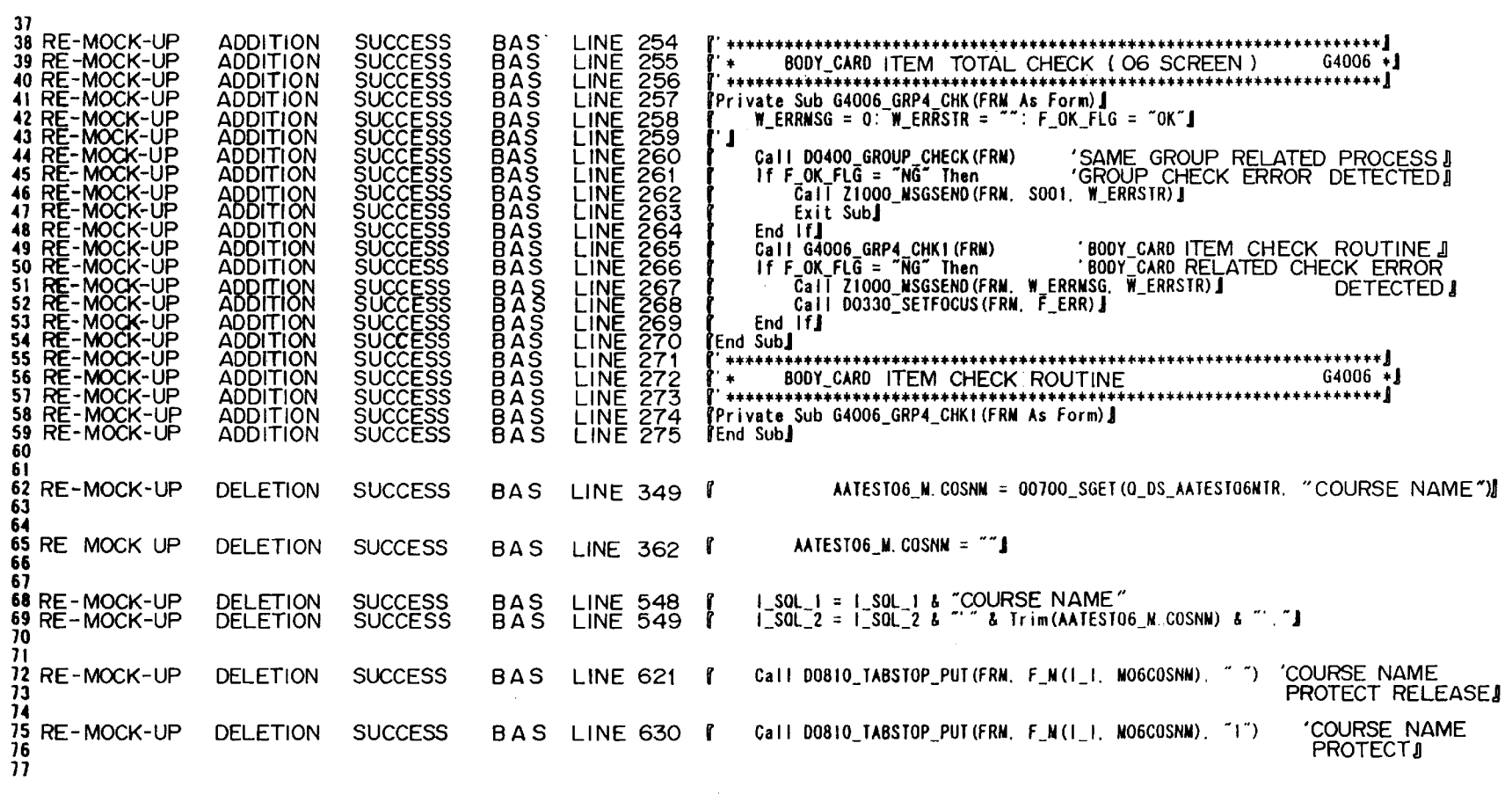

Next, FIGS. 39A and 39B show logs obtained when a re-mock-up process is performed. When the re-mockup process is performed according to changed designing information, the contents of a design change, the contents of the added or deleted codes, and their line numbers are output, and the information as to whether or not the correction has been successfully performed is also output.

Therefore, the user can be informed when and how a program has been corrected by a change in designing information.

Figure 40:
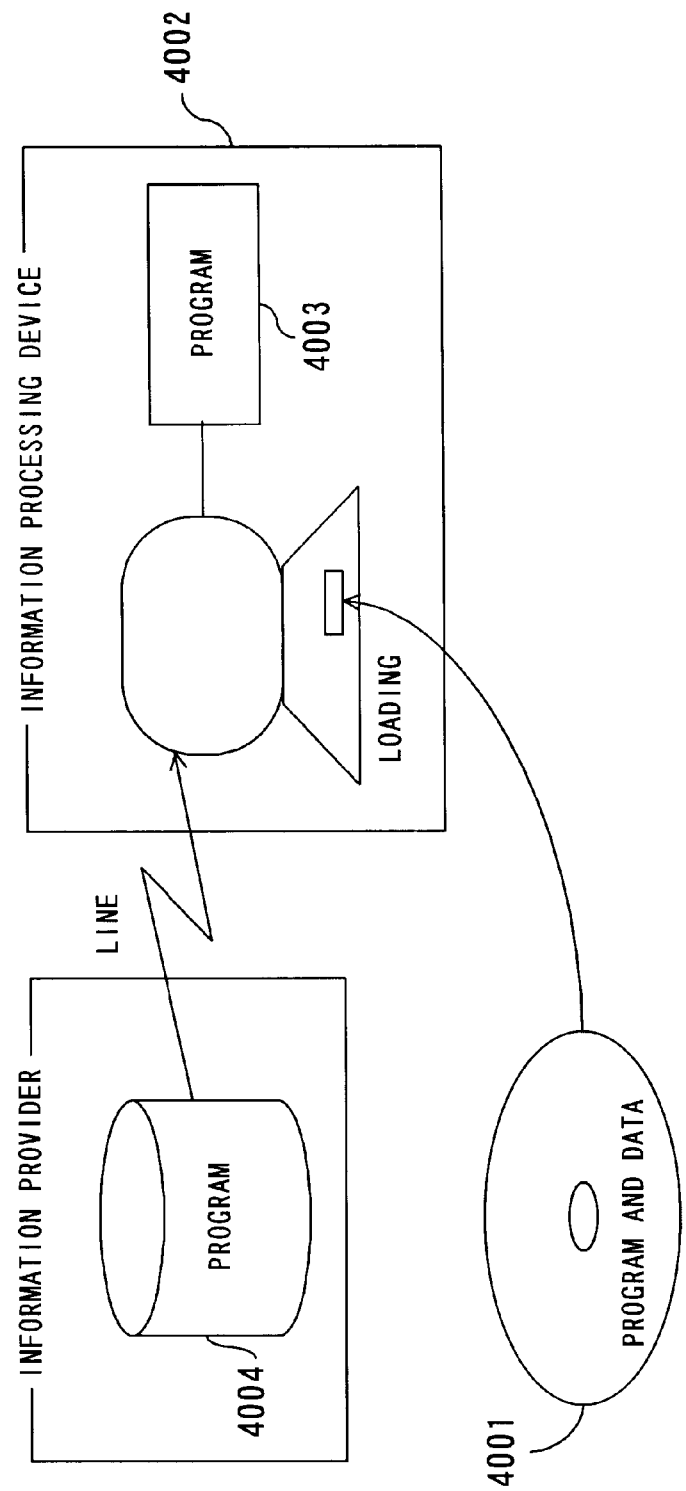
FIG. 40 shows a storage medium

In addition, a program for automatically generating a program corrected contents inherited program can be stored in a storage medium 4001 such as the floppy disk shown in FIG. 40, CDROM, etc. The storage medium 4001 is read by the medium drive device (floppy disk driver, CDROM driver, etc.) of an information processing device (personal computer, etc.) 4002. The read program can be stored in a storage medium 4003 such as a hard disk, etc. so that a program stored therein can be executed. Otherwise, a program can be stored in a storage medium 4004 such as a hard disk, etc. of a computer of an information provider, can be transferred to the information processing device 4002 in communications, and can be stored in the storage medium 4003 on the user side to execute the program. Furthermore, a program stored in the storage medium 4001 can have a part of the function shown in the flowchart according to the embodiment of the present invention.

According to the above described embodiment, old designing information is stored to be compared with latest designing information. Otherwise, the contents of a change in designing information can be stored, and an added or deleted portion of a program can be retrieved according to design change information.

Furthermore, the above described embodiment describes a Visual Basic program. However, any program can be processed. In addition, the method of retrieving an added or deleted portion by a change in designing information is not limited to a method using an correction information list box, a process list box, etc., but can be any embodiment which indicates the design change information, the added or deleted portion, and its contents.

Since a corrected portion inherited program obtained by correcting a program according to a work specification can be automatically generated according to the present invention, it is not necessary to describe corrected portions of the program such that the corrected portions can be protected when the program is automatically generated. In addition, when a program is automatically generated, a comment can be automatically inserted such that a portion added or deleted by a change in designing information can be clearly detected, thereby easily indicating how the program has been corrected by the change in designing information.

What is claimed is:

1. A method for automatically generating a corrected program inherited program, comprising:

storing old designing information and latest designing information;

retrieving a changed portion of a program according to the old designing information and the latest designing information; and automatically generating a corrected contents inherited program which inherits correction of a corrected program by adding or deleting the retrieved changed portion to or from the corrected program obtained by a user correcting a program automatically generated based on the old designing information.

2. The method according to claim 1, further comprising:

automatically generating a new program according to the latest designing information;

retrieving a first code deleted by a change in designing information based on a difference between the old designing information and the latest designing information;

retrieving a second code added by a change in designing information based on a difference between the old designing information and the latest designing information;

a step of automatically generating a corrected portion inherited program by deleting the first code from the corrected program and adding the second code.

3. The method according to claim 1, further comprising:

defining a first or second retrieved character string for use in detecting a code to be deleted from or added to a program based on a difference between the old designing information and the latest designing information; and detecting a first code to be deleted by retrieving the first retrieved character string from the corrected program when a change in designing information refers to deletion of a code of a program, detecting a second code to be added by retrieving the second retrieved character string from the new program when a change in designing information relates to addition of a code of a program, and deleting the first code from the corrected program or adding the second code to the corrected program.

4. An automatic program generation apparatus, comprising:

an old design information storage unit storing old designing information;

a latest design information storage unit storing latest designing information;

an automatic program generation unit automatically generating a program according to designing information; and a corrected portion inheriting unit retrieving a changed portion of a program according to the old designing information and the latest designing information, and automatically generating a corrected contents inherited program which inherits correction of a corrected program by adding or deleting the retrieved changed portion to or from the corrected program obtained by a user correcting a program automatically generated based on the old designing information.

5. The apparatus according to claim 4, wherein said automatic program generation unit automatically generates a new program according to latest designing information; and said corrected portion inheriting unit retrieves a first code to be deleted from a program by a change in designing information from the corrected program based on a difference between the old designing information and the latest designing information, retrieves a second code to be added by a change in designing information from the new program, deletes the first code from the corrected program and adds the second code, and inherits contents of a correction of the corrected program.

6. The apparatus according to claim 4, wherein said corrected portion inheriting unit defines a first or second retrieved character string for use in detecting a code to be deleted from or added to a program based on a difference between the old designing information and the latest designing information, detects a first code to be deleted by retrieving the first retrieved character string from the corrected program when a change in designing information refers to deletion of a code of a program, detects a second code to be added by retrieving the second retrieved character string from the new program when a change in designing information relates to addition of a code of a program, deletes the first code from the corrected program and adds the second code to the corrected program.

7. The apparatus according to claim 4, wherein said corrected portion inheriting unit comprises:
 a correction information storage unit storing a change item of designing information, and a process of either addition or deletion; and
 a process list storage unit storing a process of either addition or deletion, a code for addition or deletion, and a line number of the code in the corrected program, wherein
a retrieved character string is defined based on a change item of the designing information, a code containing the retrieved character string is retrieved from the corrected program, a line number of the code in the corrected program is obtained, the code and the line number to be deleted are entered in the process list storage unit, a code containing the retrieved character string is retrieved from the new program when the process of said correction information storage unit is addition, an addition position of the added code is obtained in the corrected program, a line number whose position has been obtained is also obtained, the code to be added and the line number are entered in said process list storage unit, and the code corresponding to the line number entered in said process list storage unit is added to or deleted from the corrected program.

8. The apparatus according to claim 4, wherein
said corrected portion inheriting unit adds a comment indicating a start or an end of addition or deletion at a starting line or an ending line of a code added or deleted by a change in designing information.

9. The apparatus according to claim 4, further comprising:
an output unit outputting a log file indicating a code and a line number added or deleted by a change in designing information.

10. A computer readable storage medium storing a program to direct a computer to perform the processes of:
retrieving a changed portion of a program according to the old designing information and the latest designing information; and
automatically generating a corrected contents inherited program which inherits correction of a corrected program by adding or deleting the retrieved changed portion to or from the corrected program obtained by a user correcting a program automatically generated based on the old designing information.

11. A method for automatically generating a corrected modified program which inherits correction of a corrected program, comprising:
retrieving a changed portion of a modified program based on changes between old and latest designing information; and
automatically generating the corrected modified program by at least one of adding and deleting the changed portion respectively to and from the corrected program obtained by a user correcting a program automatically generated based on the old designing information.

* * * * *

UNITED STATES PATENT AND TRADEMARK OFFICE
CERTIFICATE OF CORRECTION

PATENT NO.    : 6,658,645 B1
DATED         : December 2, 2003
INVENTOR(S)   : Hiromi Akuta et al.

It is certified that error appears in the above-identified patent and that said Letters Patent is hereby corrected as shown below:

Title page,
Item [56], References Cited, FOREIGN PATENT DOCUMENTS, change "0-236628" to -- 02-236628 --

Column 16
Line 28, after "code" insert -- to the corrected program --

Signed and Sealed this

Fourth Day of May, 2004

JON W. DUDAS
*Acting Director of the United States Patent and Trademark Office*